US008023708B2

(12) United States Patent
Dewaele et al.

(10) Patent No.: US 8,023,708 B2
(45) Date of Patent: Sep. 20, 2011

(54) METHOD OF SEGMENTING ANATOMIC ENTITIES IN DIGITAL MEDICAL IMAGES

(75) Inventors: Piet Dewaele, Sint-Niklass (BE); Dirk Loeckx, Kessel-Lo (BE); Dieter Seghers, Zottegem (BE)

(73) Assignees: Agfa HealthCare N.V., Mortsel (BE); Katholieke Universiteit Leuven, K.U. Leuven R&D, Leuven (BE)

( * ) Notice: Subject to any disclaimer, the term of this patent is extended or adjusted under 35 U.S.C. 154(b) by 0 days.

(21) Appl. No.: 12/716,771

(22) Filed: Mar. 3, 2010

(65) Prior Publication Data
US 2011/0026785 A1 Feb. 3, 2011

Related U.S. Application Data

(63) Continuation of application No. 11/465,724, filed on Aug. 18, 2006, now abandoned.

(60) Provisional application No. 60/715,878, filed on Sep. 9, 2005.

(30) Foreign Application Priority Data

Aug. 30, 2005 (EP) .................................... 05107903
Aug. 30, 2005 (EP) .................................... 05107907

(51) Int. Cl.
*G06K 9/00* (2006.01)
(52) U.S. Cl. ......................... 382/128; 382/190; 382/203
(58) Field of Classification Search .................. 382/128, 382/190, 203
See application file for complete search history.

(56) References Cited

FOREIGN PATENT DOCUMENTS
EP       1 349 098 A1    1/2003

OTHER PUBLICATIONS

Tsagaan et al., Lecture Notes in Computer Science: Medical Image Computing and Computer-Assisted Intervention: An Automated Segmentation Method of Kidney Using Statistical Information, Sep. 25-28, 2002, Springer, vol. 2488, pp. 556-563.*
van Ginneken et al., IEEE Transactions on Medical Imaging: Automatic Detection of Abnormalities in Chest Radiographs Using Local Texture Analysis, Feb. 2002, IEEE, vol. 21, No. 2, pp. 139-149.*
Brejl et al., IEEE Transactions on Medical Imaging: Object Localization and Border Detection Criteria Design in Edge-Based Image Segmentation: Automated Learning from Examples, Oct. 2000, IEEE, vol. 19, No. 10, pp. 973-985.*
Behiels, G. et al., "Evaluation of image features and search strategies for segmentation of bone structures in radiographs using Active Shape Models," Medical Image Analysis, vol. 6, No. 1, Mar. 2002, pp. 47-62.

(Continued)

*Primary Examiner* — Bhavesh Mehta
*Assistant Examiner* — Dennis Rosario
(74) *Attorney, Agent, or Firm* — Houston Eliseeva, LLP

(57) ABSTRACT

For each of a number of landmarks in an image an initial position of the landmark is defined. Next a neighborhood around the initial position, comprising a number of candidate locations of the landmark is sampled and a cost is associated with each of the candidate locations. A cost function expressing a weighted sum of overall gray level cost and overall shape cost for all candidate locations is optimized. A segmented anatomic entity is defined as a path through a selected combination of candidate locations for which combination the cost function is optimized.

21 Claims, 15 Drawing Sheets

OTHER PUBLICATIONS

Behiels, et al., Lecture Notes in Computer Science: Medical Image Computing and Computer-Assisted Intevention: Active Shape Model-Based Segmentation of Digital X-ray Images, Springer-Verlag Berlin Heidelberg, pp. 128-138, 1999.

Cootes, T. F. et al., "Active Shape Models—their training and applications," Computer Vision and Image Understanding, 61(1):38-59, 1995.

Cremers, et al., Diffusion Snakes: Introducing Statistical Shape Knowledge into the Mumford-Shah Functional, International Journal of Computer Vision: Kluwer Academic Publishers, pp. 295-313, 2002.

Florack, Luc M. J. et al, "Scale and the Differential Structure of Images," Image and Vision Computing, vol. 10 (6):376-388, 1992.

Kass, Michael, et al., "Snakes: Active Contour Models," International Journal of Computer Vision, 1(4):321-331, 1988.

Koenderink, Jan J., et al., "The Structure of Locally Orderless Images," International Journal of Computer Vision, 31(2/3):159-168, 1999.

Sethian, J. A., "Level Set Methods and Fast Marching Methods: Evolving Interfaces in Computational Geometry, Fluid Mechanics, Computer Vision, and Materials Science ," Cambridge University Press, Cambride, U.K., pp. 1-378, 1999.

Tsagaan B., et al., "Segmentation of kidney by using a deformable model," Proceedings 2001 International conference on Image Processing. ICIP 2001. Thessaloniki, Greece, Oct. 7-10, 2001, International Conference on Image Processing, New York, NY: IEEE, US, vol. vol. 1 of 3 Conf. 8, Oct. 7, 2001, pp. 1059-1062.

Van Ginneken, B. et al., "Active Shape Model Segmentation with Optimal Features," IEEE Transactions on Medical Imaging, vol. 21, No. 8, Aug. 2002, pp. 924-933.

European Search Report from counterpart European Patent Application EP 05 10 7907, filed Aug. 30, 2005.

* cited by examiner (a)

(b)

METHOD OF SEGMENTING ANATOMIC ENTITIES IN DIGITAL MEDICAL IMAGES

RELATED APPLICATIONS

This application is a Continuation of U.S. application Ser. No. 11/465,724, filed Aug. 18, 2006, which claims priority to European Application Nos. EP 05107903.6, filed Aug. 30, 2005, and EP 05107907.7, filed Aug. 30, 2005, and also claims the benefit of U.S. Provisional Application No. 60/715,878, filed on Sep. 9, 2005, all four of which are incorporated herein by reference in their entirety.

FIELD OF THE INVENTION

The present invention relates to a method of segmenting an entity in a digital image, more specifically an anatomic entity in a digital medical image. The segmentation process according to the present invention is based on the use of geometric and photometric models of an image.

The method of the present invention can inter alia be used as a process of performing geometric measurements on digital images, more specifically on digital medical images.

BACKGROUND OF THE INVENTION

In radiological practice, geometric measurements are frequently used to aid diagnosis of abnormalities. In order to perform these measurements, key user points must be placed in an image, for example in an image displayed on a display device, on their corresponding anatomical landmark position. Measurements such as the distance between two points, or the angulation between lines are based on the position of these key user points. Furthermore, the geometry as a whole may be assessed for normality or abnormality, involving an analysis of the complete shape. Hence there is a need to automate and objectify the extraction of quantitative information that is embedded in a radiological image.

An example of such a frequently performed measurement is the computation of the cardiothoracic ratio (CTR) in thorax RX images (FIG. 6). This ratio is defined as the ratio of the transverse diameter of the heart, at the level of the apex, to the internal diameter of the thorax (ID), i.e. CTR=(MLD+MRD)/ID.

The transverse diameter of the heart is composed of the maximum transverse diameter on the left side of the heart (MLD) and the maximum transverse diameter on the right side of the heart (MRD). Clearly, this definition entails that the radiologist searches along the inner border of the left and right ribcage boundary to locate the point pair needed to compute the internal diameter ID. This point pair must lie at the greatest internal diameter of the thorax. Likewise, the left and right heart shadow border must be searched to locate the points needed to compute the sum of MLD and MRD. More specifically, these points are situated most distant with respect to the midline of the spine. The process of border search requires that the radiologist is performing anatomy segmentation and locating the points (a total of four in this example) on the segmented anatomy. The segmentation step, in the case of CTR computation, amounts to delineating the lung fields.

Many other measurements in digital images follow a similar approach involving the segmentation (224,418) of the anatomic organ or entity onto which segmented geometry the characteristic points (510) and measurement objects (512) are determined and finally measurements (514) are performed (FIG. 5).

Referring to the example of cardiothoracic index calculation, to automatically position the required points, a method is needed to automatically segment the lung fields on a chest radiographic image.

The segmentation problem can be approached in several ways, depending on the application. Segmentation strategies evolved from low-level strategies in the early years of computer vision to the more recent model-based strategies.

Low-level methods rely on local image operators separating pixels with different photometric characteristics and grouping of pixels with similar local photometric characteristics. Examples of both classes are edge detection and region growing. Despite the poor performance of these low-level approaches, they are very popular in most commercial image analysis tools. The main reasons are that they are simple to understand and to implement. For complex image data however, such as present in medical images and exemplified by the content of a thorax image as described above, their usefulness is limited.

More successful methods incorporate a priori knowledge about the shape to be segmented and about the photometric or gray-level appearance of the object in the image. These methods, referred to as model-based methods are often based on template matching. A template is matched for instance by correlation or with generalized Hough transform techniques. Unfortunately, the template matching is likely to fail in case of medical images. This is due to the large variability in shape and gray-level appearance that the anatomic object may exhibit.

Methods based on active contours, introduced by Kass et. al. (M. Kass, A. Witkin, and D. Terzopoulos, Snakes: active contour models, Int. J. Computer Vision, 1(4):321-331, 1988) and level sets (J. A. Sethian, Level set methods and fast marching methods, Cambridge Univ. Press, Cambridge, U.K. 1999) are able to cope with a larger shape variability, but are still unsuited for many medical segmentation tasks because little a priori knowledge about the object to be segmented can be incorporated. Handcrafted parametric models overcome this problem, but are limited to a single application.

In view of these shortcomings, it is obvious that there is need for a generic segmentation scheme that can be trained with examples in order to acquire knowledge about the shape of the object to be segmented and the gray-level appearance of the object in the image. Active shape models (ASMs), introduced by Cootes and Taylor (T. F. Cootes, C. J. Taylor, D. Cooper, J. Graham, Active Shape Models—their training and applications, Computer Vision and Image Understanding, 61(1):38-59, 1995) satisfy this definition of segmentation schemes. The shape model is given by the principal components of vectors of landmark points. The gray-level appearance model describes the statistics of the normalized first derivative of profiles centered at each landmark that run perpendicular to the object contour. The location of a landmark in a new image is found by minimizing the Mahalanobis distance between the first derivative profile and the distribution of the profile. This algorithm starts from an initial estimate and performs a fitting procedure, which is an alternation of landmark displacements and shape model fitting. Similar approaches have been devised all employing a three-step procedure. First, they all use a shape model that ensures that plausible results are generated. Secondly, they use a gray-level appearance model to place the object at a location where the gray-level pattern around the border or within the object is similar to what is expected from the training examples. Finally, the algorithm fits the model by minimizing some cost function.

SUMMARY OF THE INVENTION

The approach presented by active shape models is still faced with several limitations.

A first limitation is the need for an initial estimate, known as the initial positioning problem. In some cases, an extensive search for a proper initial contour is needed in this framework.

A second limitation lies in the alternate use of shape model and gray-level appearance model. Firstly, the segmentation estimate is updated using the gray-level appearance model. Secondly, the shape model is fitted to the updated contour. Unfortunately the shape model is misled if the gray-level appearance model wrongly locates a landmark.

Some experiments with active shape model segmentation schemes exhibited another problem. If the gray-level appearance model for a specific landmark is used to find a better location for that landmark, it requires that the true landmark location lies inside the region the algorithm is exploring. In some cases the algorithm may search for a landmark in the region of another landmark. This means that the wrong gray-level appearance model is used at the wrong region, resulting in a poor segmentation.

It is an object of the present invention to provide a method of segmenting an entity in a digital image, more specifically an anatomic entity in a digital medical image, that overcomes the problems of the prior art.

The above-mentioned aspects are realized by a method of segmenting an anatomic entity in a digital medical image comprising the following steps: defining, for each of a number of landmarks in said image, an initial position of said landmark, sampling a neighborhood around said initial position, said neighborhood comprising a number of candidate locations of said landmark, associating a cost with each of said candidate locations, optimizing a cost function expressing a weighted sum of overall gray level cost and overall shape cost for all candidate locations, defining a segmented anatomic entity as a path through a selected combination of said candidate locations for which combination said cost function is optimized, wherein said cost associated with a candidate location is the total gray level cost obtained by summing gray level costs of said candidate location in every feature image of a set of feature images calculated for said medical image, said gray level costs being expressed as the Mahalanobis distance defined as the distance between the gray value profile at said candidate location with a corresponding mean profile weighted by the inverse of a corresponding covariance matrix, said mean profile and covariance matrix retrieved from a gray value model associated with said anatomic entity.

Specific features for preferred embodiments of the invention are as follows:
- said gray value model is obtained by the steps of sampling a manually segmented outline of said anatomic entity at a number of landmark points; sampling a number of points in a neighborhood of each of said landmark points; for each landmark point arranging sampled points in a neighborhood around a landmark point in a profile;
- computing at least one feature image; computing a mean profile for each landmark point and for each feature image; computing a covariance matrix of the profiles for each landmark point and each feature image; identifying said mean profile and covariance matrix as gray value model of said anatomic entity;
- a feature image is a derivative image at a predefined scale σ or an image representation comprising mathematical moments of the local histogram of said image or derivative image in a window with width α around the location of a landmark.
- said overall gray level cost is a combination of all individual gray level costs of a profile in a number of feature images whereby said individual cost is the Mahalanobis distance defined as the distance between said profile and the mean profile of that feature weighted with the inverse of the covariance matrix, said mean profile and covariance matrix being retrieved from a gray value model of said anatomic entity.
- said gray value model is obtained by the steps of sampling a manually segmented outline of said anatomic entity at a number of landmark points; sampling a number of points in a neighborhood of each of said landmark points; for each landmark point arranging sampled points in a neighborhood around a landmark point in a profile; computing at least one feature image; computing a mean profile for each landmark point and for each feature image; computing a covariance matrix of the profiles for each landmark point and each feature image; identifying said mean profile and covariance matrix as gray value model of said anatomic entity.
- said overall shape cost is a combination of all individual costs of connection vectors, said connection vectors connecting successive landmarks, for all landmarks whereby said individual shape cost is expressed by the Mahalanobis distance defined as the distance of a connection vector between two successive landmarks to the mean connection vector weighted with the inverse of the covariance matrix, said mean connection vector and covariance matrix being retrieved from a shape model of said anatomic entity.
- said shape model is obtained by the steps of sampling a manually segmented outline of said anatomic entity at a number of landmark points; computing connection vectors or connection vector differences between successive landmark points; computing a mean connection vector or mean connection vector difference for successive pairs of landmark points; computing a covariance matrix of connection vectors or connection vector differences; identifying said mean connection vector and covariance matrix as a geometric model of said anatomic entity.
- said cost function is optimized by dynamic programming.
- said number of candidate locations is reduced by selecting those with minimal total gray value cost, said total gray value cost being the sum over all feature images of all gray value costs for the candidate position in said neighborhood, said gray value cost expressed as a Mahalanobis distance defined as the distance of a gray value profile at the candidate location to a corresponding mean profile weighted with the inverse of a covariance matrix, said mean profile and covariance matrix retrieved from a gray value model associated with said anatomic entity.
- said neighborhood comprises a rectangular grid of sampling points.
- said neighbourhood comprises a circular profile.
- said gray value model and said geometric model are constructed from and applied to a multi-resolution representation of the image.

Another aspect of this invention relates to a method of measuring an anatomic entity in a digital medical image as set out in the appending claims.

In the following the terms gray value model, gray value appearance model, gray level model, gray level appearance model and photometric model are used as synonyms.

Likewise the terms shape model and geometric model are used as synonyms.

The terms feature image and feature are also used as synonyms.

The embodiments of the methods of the present invention are generally implemented in the form of a computer program product adapted to carry out the method steps of the present invention when run on a computer. The computer program product is commonly stored in a computer readable carrier medium such as a DVD or a CD-ROM. Alternatively the computer program product takes the form of an electric signal and can be communicated to a user through electronic communication.

In EP A 1349098, which is incorporated herein by this reference, a method is disclosed to automate the measurements in digitally acquired medical images by grouping measurement objects and entities into a computerized measurement scheme including a bi-directionally linked external graphical model and an internal informatics model.

In a measurement session according to EP A 1349098, a measurement scheme is retrieved from the computer and activated. Measurements are subsequently performed on the displayed image under guidance of the activated measurement scheme.

In this computerized method, a multitude of geometric objects are mapped in the digital image onto which other measurement objects and finally measurement entities (such as distances and angles) are based. The basic geometric objects are typically key user points, which define other geometric objects onto which geometric measurements are based. The above identified patent application does not disclose however how the mapping may be effectuated automatically without the need of user positioning and manipulation of key measurement points. The method according to the present invention can be used to effectuate this mapping.

According to the present invention, a segmentation method is provided which comprises the construction of models of anatomic entities such as an organ or a structure in a medical image, which models can be trained from examples so as to obtain knowledge of the gray value appearance and knowledge of the shape of the anatomic entity to be segmented.

The gray value appearance model comprises the probability distribution of the gray value and a number of multiscale derivatives of gray values at a set of landmarks distributed over the anatomic outline.

The shape model comprises the probability distribution of each connection vector between successive landmarks along the outline of an anatomic entity.

A discrete point-based object representation is introduced to describe the anatomic outline in a medical image.

Two strategies and associated systems for generating models and application of the models to segment actual images are disclosed.

These strategies, although decomposing in building blocks with equal goals, construct and employ different photometric and geometric model knowledge.

First, a new gray level appearance model is constructed from training images, encoding photometric knowledge at landmark positions. This step exploits intensity correlation in neighborhoods sampled around each landmark.

Secondly, a shape model is constructed, encoding geometric knowledge between landmarks. This step exploits spatial correlation between landmarks of the segmented objects.

In a segmentation step, photometric and geometric knowledge are jointly used to segment one or more anatomic contours on a new image.

The resulting segmentations may be used to derive the position of desired measurement points in the course of performing geometric measurements on an image.

Measurement points can be defined in either a direct or an indirect way.

In the direct way, the positions of the landmarks are used as individual measurement points.

In the indirect way, the landmarks resulting from the segmentation process are interconnected by a curve and characteristic points on this curve are defined as measurement points.

Gray Level Appearance Models

The first step in each modeling system constrains the geometric position of the landmark to lie on a linear path perpendicular to the present contour or a sparse grid centered on the landmark. The photometric pattern at a landmark point in an image is captured by a profile vector sampled in feature images based on image derivates extracted at a number of scales. The profile sampling may be along a linear path in the images or on a circular path around the landmark point.

Feature Images

When the photometric pattern is computed for all image points in the image, feature images are obtained, the size of which is equal to that of the original image. Neighborhood operations are typically employed to compute the feature images. The values of the features in the feature image for a specific point can be arranged in a feature vector. The computation of feature images typically comprise two steps: (a) a linear filtering step using a bank of convolution kernels and (b) a post-processing step involving the sub-steps of a non-linear point operation combined with the computation of local image statistics. In step (b) one of the sub-steps may be performed alone.

Different filters and different types of post-processing lead to different types of feature images. For example, Laws constructed 25 two-dimensional convolution kernels as the outer product of pairs of vectors resembling ideal feature profiles such as Level, Edge, Spot, Wave and Ripple. The post-processing step comprises non-linear windowing in which the absolute filtered values are averaged in larger windows to obtain image texture energy measures. Unser used filter banks constructed as the outer product of vectors corresponding to well-known transforms like discrete sine (DST), discrete cosine (DCT), discrete even sine (DEST), discrete real even Fourier (DREFT), discrete real odd Fourier (DROFT) transforms, and for post-processing the computation of the channel variances. Finally, Gabor filter banks are constructed using symmetric or anti-symmetric Gabor filters tuned to combinations of different spatial frequencies and different orientations, such that all outputs have equal frequency bandwidth. The non-linear point operation step may include thresholding in this case.

Other image characteristics may be measured using feature images based on multi-resolution wavelets filters, rank-value filters or adaptive filters.

Feature images based on locally orderless images (LOI's)

The image structure around an anatomical landmark in a medical image exhibits a typical gray-level pattern. In the present invention, this structure is captured in a number N of mathematical features as outlined in the sequel. The concept of using feature images to build a gray-level appearance model was introduced earlier in B. Van Ginneken et al., Active shape model segmentation with optimal features, IEEE Trans. on Medical Imaging, 21(8):924-933, 2002, based on so-called locally orderless images (LOI's) presented by J. J.

Koenderink and A. J. Vandoorn, The structure of locally orderless images, Int. J. of Computer Vision, 31(2):159-168, 1999.

A Taylor expansion can be used to approximate a gray-level function $f$ around a point of interest, i.e. a landmark, at position $x_0$, by a polynomial of order K. The coefficients of each term are given by the derivatives $f^{(i)}$ at $x_0$:

$$f(x) \approx \sum_{i=0}^{K} \frac{1}{i!} f^{(n)}(x_0)(x-x_0)^i$$

All information in this function approximation is contained in the derivatives $f^{(i)}$. Similarly, the image can be described by an image filter bank containing the derivatives of the original image ($L, L_x, L_y, L_{xx}, L_{yy}, L_{xy}, \ldots$). Each derivative image may further be computed at a number of blurring or inner scales $\sigma$. The feature images are finally obtained by computing the post-processing step as local image statistics of each derivate image. The local image statistics comprise a number of moments of the local histogram in a window with width $\alpha$ around each location $x_0$. In a specific embodiment the first and second histogram moments, all derivatives up to second-order ($L, L_x, L_y, L_{xx}, L_{yy}, L_{xy}$) and 5 inner scales ($\sigma=0.5, 1, 2, 4, 8$ pixels) are computed, amounting to a total of N=2×6×5=60 feature images. The window scale to compute the histogram is in accordance to the inner scale, i.e. $\alpha=2\sigma$.

The limitation of using the derivatives in the row and column directly (i.e. x resp. y) in the feature vector is the lack of invariance with respect to translation and rotation (i.e. Euclidean Transformations). Unless the images are anti-rotated into a standard orientation, these operators can only be trained on examples that have the same orientation. Cartesian differential invariants (CDI) describe the differential structure of an image independently of the chosen Cartesian coordinate system; hence the anti-rotation step can be omitted. The construction of CDI's from Gaussian differential operators was described in L. M. J. Florack et al., Scale and the differential structure of images, Image and Vision Computing, Vol. 10 (6):376-388, 1992. The following are CDI's using derivatives up to second order: ($L, L_{xx}+L_{yy}, L_x^2+L_y^2, L_x^2 L_{xx}+2L_{xy}L_xL_y+L_y^2L_{yy}, L_{xx}^2+2L_{xy}^2+L_{yy}^2$). Again, at each pixel location, feature images are constructed using these operators at number of inner scales $\sigma$ and computing the first two moments of the locally orderless histograms in windows of extent $\alpha$, with $\alpha$ linked to the inner scale, e.g. $\alpha=2\sigma$. These operators are independent to Euclidean transformations of image geometry, but still depend on the choice of the scale parameter $\sigma$.

Profile and Feature Similarity Measurement

The gray level appearance model is built on the basis of a mean profile and variance-covariance matrix, and exploits intensity correlation between points of the profile, as explained next. The intensity at a profile is characterized by the intensity feature vector as outlined above.

In order to compare a profile with another profile, it is necessary to know how each point in the profile relates to any other point, and to measure the extent by which the value of a certain point of the profile varies from the mean with respect to any of the other points. This statistical relationship is captured by the covariance measure, which is always computed between 2 points (or the features at those points). If the covariance is measured between the feature value of a point and itself, the variance is obtained. When the profile includes k points at either side of the contour, for a total of 2k+1 points, (2k+1)k number of relationships exists. The covariance between a pair of points from the profile tells the way how a first value of the pair varies with respect to the second. When the covariance is large and positive, it indicates that when the first point's feature value increases, so does the second in a proportional way. When the covariance is large and negative, it indicates that when the first point's feature value increases, the second decreases in a proportional way. When the covariance is zero, it means that there is no systematic coupling in the feature values, i.e. they are independent of each other. All variance-covariance pairs can be arranged in a covariance matrix S, which is symmetrical about the main diagonal. The covariance matrix thus captures all structural dependencies between feature value pairs in the profile. In practice, the covariance matrix is built from learning samples, in this case a collection of profiles at a number of landmarks and a number of intensity features in a set of training images.

The covariance relates to how distance is calculated in higher dimensional space, i.e. the space of the 2k+1 points in a given profile, to compute the distance between a current profile and a model profile. When the profiles would only comprise a single point with value x, the profiles could be compared with the model point value $\bar{x}$ for similarity just by subtracting the values of the current profile point and model profile point and taking the absolute value, i.e. $d=|x-\bar{x}|$. When the profiles would comprise two points, the distance between the 2-vector x and the model 2-vector $\bar{x}$ could be computed as the Euclidean distance in the plane, i.e.

$$d = \sqrt{(x-\bar{x})'(x-\bar{x})} = \sqrt{|x_1-\bar{x}_1|^2 + |x_2-\bar{x}_2|^2}.$$

Euclidean distance weighs all directions equally. However, when the variables $x_1$ and $x_2$ have unequal standard deviations $\sigma_1$ resp. $\sigma_2$, the contours of iso-distance lines are ellipses with major axes parallel to the coordinate axes. The differences may be weighted with the inverse of the standard deviation, resulting in the weighted Euclidean distance $$d_w = \sqrt{(x-\bar{x})'W(x-\bar{x})} = \sqrt{\left|\frac{x_1-\bar{x}_1}{\sigma_1}\right|^2 + \left|\frac{x_2-\bar{x}_2}{\sigma_2}\right|^2}.$$

The matrix W contains the inverse of the variances of the variables, i.e.

$$W = \begin{bmatrix} 1/\sigma_1^2 & \\ & 1/\sigma_2^2 \end{bmatrix}.$$

Intensity levels of pixels close to each other as in the case of linear or circular profiles will be heavily correlated when they belong to an identical anatomical region with smoothly varying intensity levels. When pixel pairs are considered belonging to different tissues, the correlation may be inversely proportional. In either case, imaging noise and unimportant anatomical variation introduces a non-zero variance for the intensity level of the pixel itself.

Hence, if the variables are also correlated and have different variances, the inverse of the covariance matrix must be inserted, yielding the so-called Mahalanobis distance $$d_m = \sqrt{(x-\bar{x})'S^{-1}(x-\bar{x})}.$$

The Mahalanobis distance weights the distance of a multi-dimensional data point x from its mean $\bar{x}$ such that observations that are on the same multivariate normal density contour will have the same distance $d_m$. These Mahalanobis iso-distance contours take the form of ellipses in two-dimensional space, and ellipsoids in three-dimensional space. Obviously, the number of points in the profile 2k+1 is normally much higher than three, in which case the iso-distance loci take the form of hyper-ellipsoids in multi-dimensional space.

The gray level appearance model is obtained from a training image set, and includes for each landmark in a mean profile and a covariance matrix for each of the features. The total of stored models is thus proportional to the number of landmarks and the number of features.

Shape Models

The positional correlation between landmarks along the contour is taken into account in a shape modeling step. Because segmentation of anatomic structures with relatively deterministic shape is aimed at, knowledge regarding the shape must preferably encode the deterministic component, along with relevant anatomical variation, and further preferably ignore irrelevant shape details.

Two embodiments are outlined to take into account positional correlation. The first is based on a global approach involving the use of all landmark positions simultaneously; the second employs a local approach, modeling the spatial disposition of successive landmarks.

PCA Analysis and Fitting

In the first embodiment, a variance-covariance matrix of landmark coordinate positions is constructed from manually placed landmarks in a set of aligned training images. Each diagonal entry in the variance-covariance matrix represents the variance of the coordinate values of the landmarks. The non-diagonal entries represent the co-variance of pairs of landmark coordinate values, i.e. it expresses how the coordinates of two landmarks vary with respect to each other. The variation may systematically be in equal 'positive directions' with respect to their means, yielding high positive covariance, or systematically in equal 'negative directions' with respect to their respective means, yielding high negative covariance, or randomly in opposite directions with respect to their means, yielding zero covariance. An eigenvector/eigenvalue analysis, known in the prior art as Principal Components Analysis (PCA), will detect any global systematic variation modes of the landmarks with respect to the mean landmark positions. PCA aims to reduce the dimensionality of a data set by only keeping the components of coordinate set with largest variation; it therefore statistically decorrelates the original coordinate positions. By projecting onto these highly varying subspaces, the relevant statistics can be approximated by a smaller dimensional system that retains important shape features. A sufficient number of these principal modes are retained and used as the shape model, ignoring the other modes attributed to noisy variations.

Landmark Connection Vector Model

The second embodiment aims at modeling the disposition of successive landmarks at the local level. However, this restriction does not imply that the global shape is not captured. The shape outline can be completely reconstructed given the start point coordinates and the connection vectors, by iteratively adding the connection vector to the current point, starting from the start point. This property is exploited in shape description at the pixel level by chain codes for example. The connection vector is a discrete approximation of the local tangent vector to the curve. When taking into account the direction vector between successive landmarks, i.e. first order geometric derivatives, it allows describing the shape of the object irrespective of translations of the object. By taking into account the curvature, i.e. second order geometric differentiation, between successive landmarks, for example expressed by the angle subtended by two successive connection vectors, the shape of the object can be described irrespective of translations and rotations of the shape (so-called rigid body transformations). In that case the curve can be completely reconstructed when the start position, and the first geometric derivative (i.e. start connection vector) is known, by iteratively adding the difference vector of successive tangent vectors. Curvature based on a chain code at the pixel level is usually highly noise dependent for the scale is at a too fine level. This drawback is coped with in the present disclosure because the landmarks are sufficiently spaced apart so as to enable computation of noise-independent yet accurate first or second order derivative information. Because the magnitude of tangent or curvature vector depends on scale, normalizing the size of each curve of the training set to unity for example, further allows describing the curve up to an Euclidean similarity transformation. The mean and covariance statistics of displacement vectors (i.e. first derivative or tangent) or vector differences of displacement vectors (i.e. second derivative or curvature) between manually placed landmarks in a set of aligned training images constitutes the shape model of this embodiment.

Segmentation Systems

Segmentation systems can also be organised along two tracks each having building blocks with related objectives.

A first building block aims at confining the admissible positions of instantiated model landmark positions to a number of most probable locations in a target image.

In the case landmarks are represented by linear profiles in feature images, a best point voting approach can be adopted that ranks a set of candidate positions on a perpendicular line through an instantiated landmark.

For a circular profile case, a rectangular search grid can be considered at each instantiated landmark and grid crossing positions are ranked according to the combined Mahalanobis distance of circular profiles through all feature images to the model circular profiles. Second and third building blocks jointly constitute an optimization step. A cost matrix may be constructed, using the cost measures associated with the retained admissible position for each landmark. The cost comprises a term associated with agreement in gray level appearance. Agreement with the shape model may be verified at the global level using weighted PCA contour fitting. Alternatively, the shape agreement may be verified by incorporating a shape cost associated with the candidate position of the landmark. A dynamic programming algorithm can be used to construct a minimum cost path through the cost matrix, yielding the final segmentation as the path with lowest overall cost.

Finally, characteristic points on the final segmentation may indirectly define the geometrical position of the key measurement points, and all depending measurement objects and measurement quantities may be generated on the basis of these key measurement points.

Alternatively, the landmark points used in the segmentation may be used to directly define the key measurement points and a search grid for each measurement point may be provided to locate the admissible positions of the measurement point.

Further specific embodiments and associated advantages of the present invention will become apparent from the following description and drawings.

DETAILED DESCRIPTION OF THE INVENTION

The present invention will be explained in detail with regard to a specific application, namely the segmentation of the lung field in a medical image.

Object Representation

In the specific embodiments of the method of the present invention that are described below, an anatomical object in an image is represented mathematically as a fixed number of discrete, labeled points lying on the contour that encloses the object, i.e. $p_1=(x_1,y_1), \ldots, p_n=(x_n,y_n)$.

Figure 7:
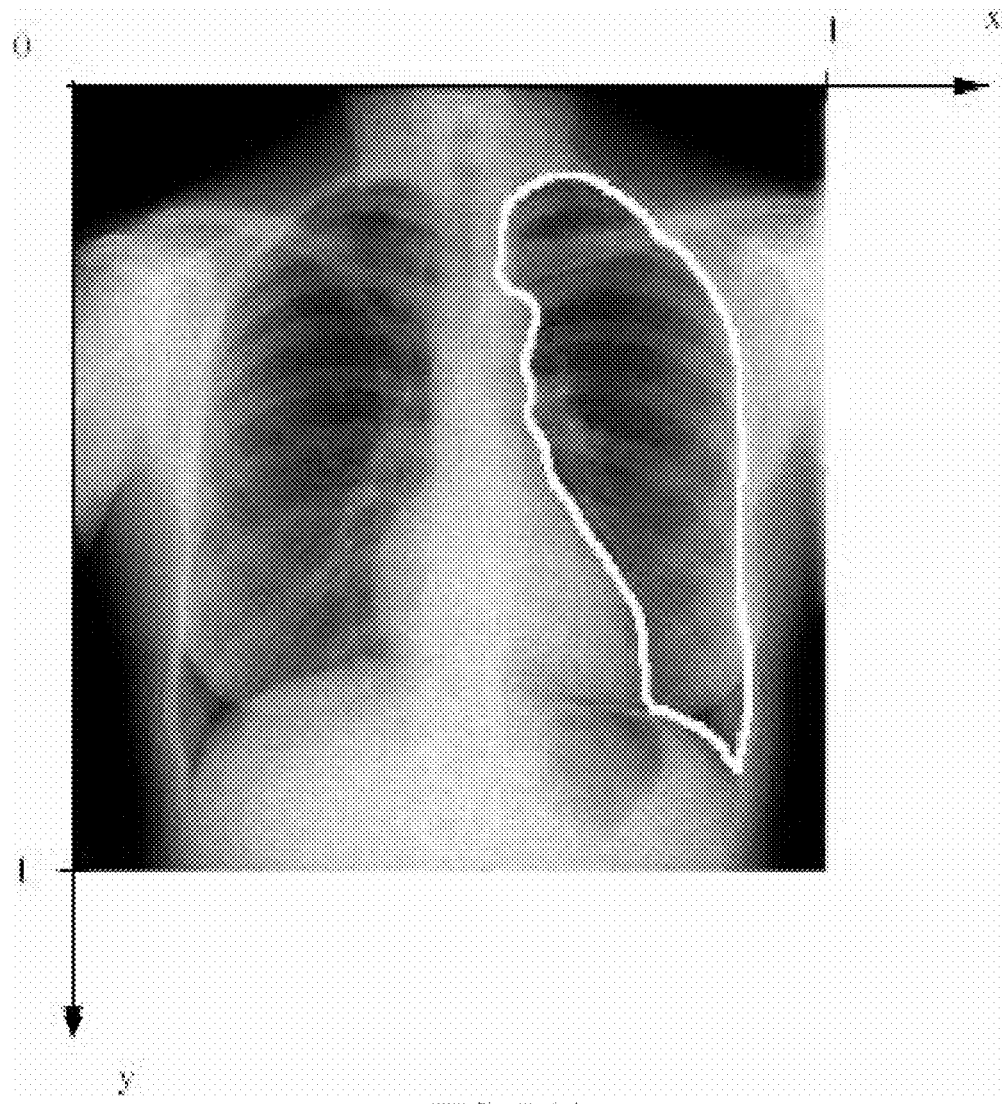
Figure 7:
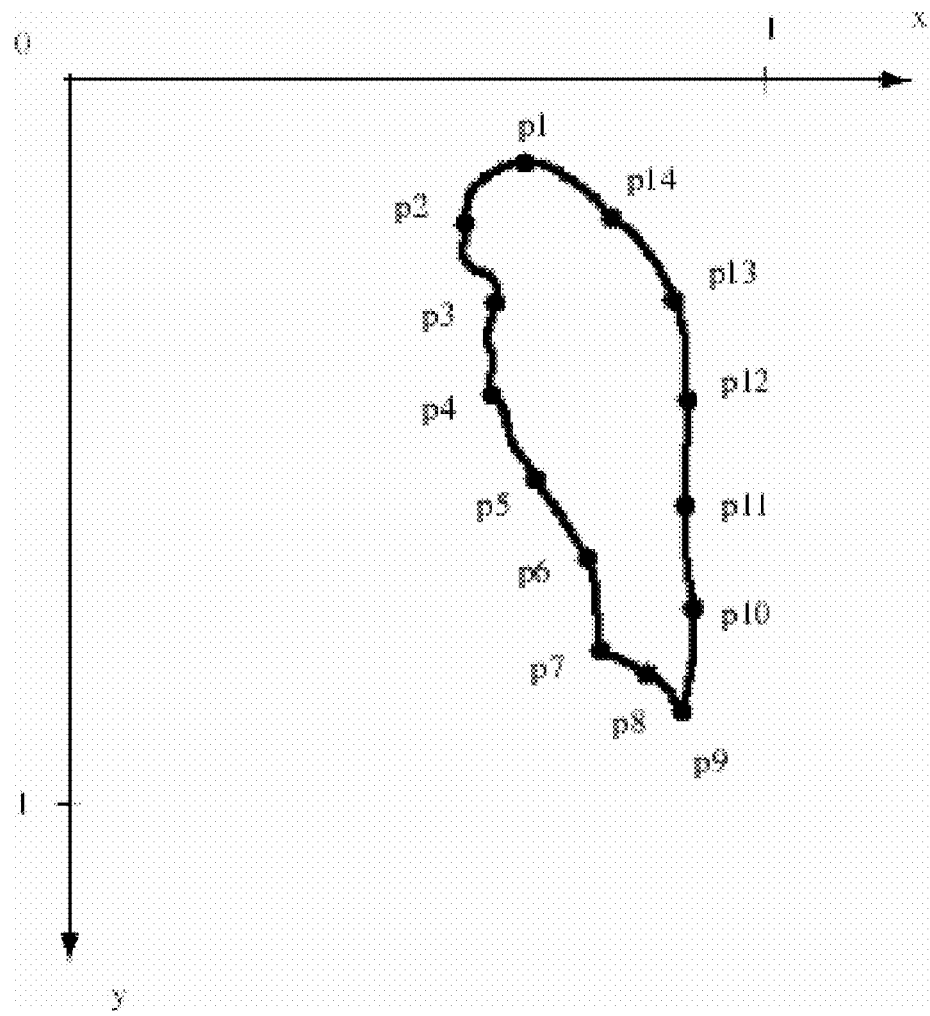

The contour $\{p_i\}_{i=1}^n$ runs from $p_1$ to $p_n$ and back to $p_1$. Hence, the object may be captured by a discrete shape vector $x=(x_1,y_1,\ldots,x_n,y_n)^T$. The coordinate system is chosen such that all points inside the image area lie in the domain $[0,1]\times[0,1]$ (FIG. 7).

The segmentation scheme described below needs a number of training images, in which the shape vectors x are manually determined. Once the algorithm is trained on the data set, it is able to produce the shape vector in a new image.

The continuous contour of an anatomical object can be reconstructed by curve interpolation from the points $\{p_i\}_{i=1}^n$. A first order interpolation links successive points with a line segment, resulting in a polygonal approximation. Higher order interpolations may be used to achieve a smoother outline. Irrespective of the order, the continuous representation can be used to derive spatial properties of the curve, such as the tangent direction along the curve, or the normal direction at a certain point on the curve.

Figure 1:
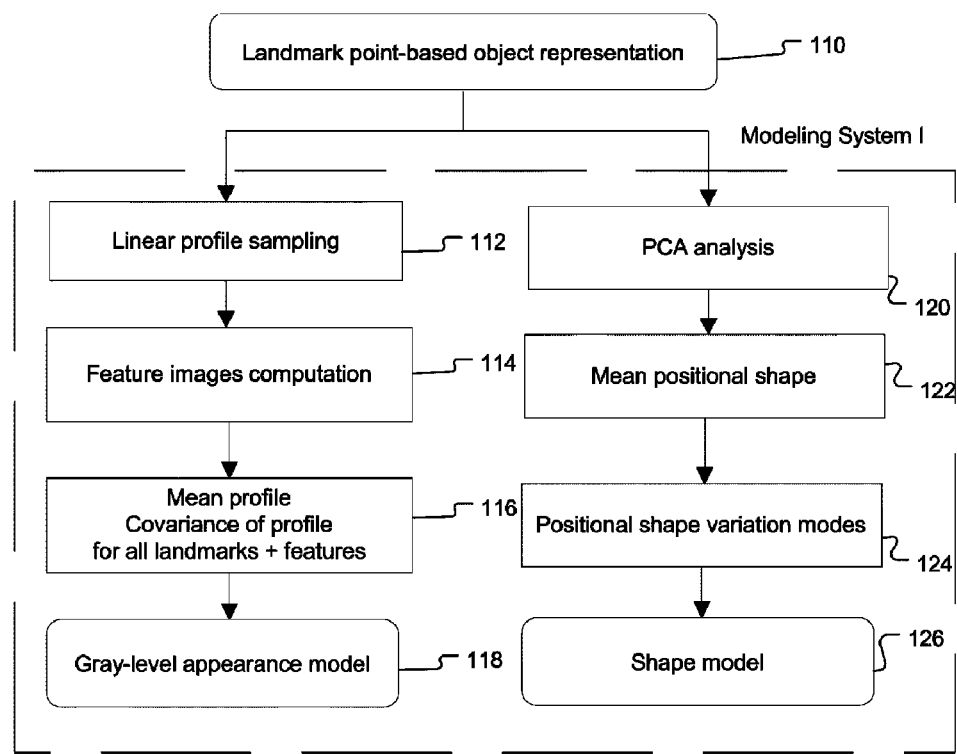
FIG. 1 is a flow chart illustrating a first modeling system (Modeling system I) according to the present invention.

Modeling System I (FIG. 1)

Gray Level Appearance Model

The gray level appearance model (118) (also called photometric model) captures the spatial intensity distribution in the neighborhood of so-called landmarks (also called landmark points). The spatial component of the gray level appearance model has been devised along the use of gray-level profiles. As will be apparent from their construction, other schemes can be employed.

The number n of landmarks (110) that is for example used to accurately describe a lung field outline may be as low as 14, e.g. landmark 1 denotes the uppermost point of each lung field, landmark 7 is positioned at the cross section of either the left or right heart shadow with their respective hemi-diaphragm, landmark 9 denoting the costophrenic angle. The other landmarks can be equidistantly positioned between these major landmarks. Obviously, a higher number of landmarks may be used.

Figure 9:
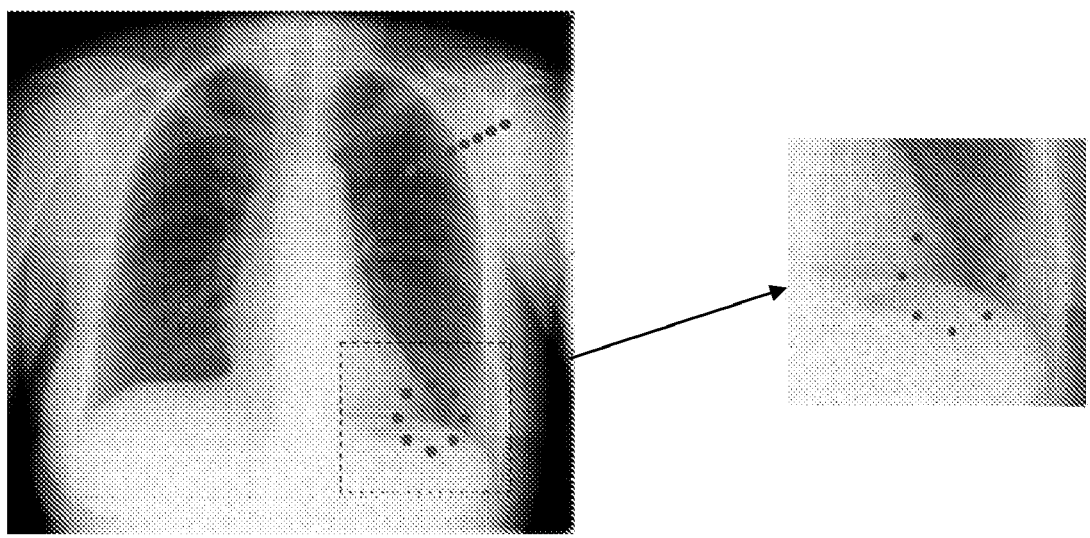
FIG. 9 illustrates a linear and a circular gray-level profile as a sampling of gray values at a number of points on a line resp. a circle with radius $r_c$ around the landmark.

Linear Gray-Level Profiles (FIG. 9)

At each landmark, the gray level appearance model describing the typical image structure around the landmark is sampled perpendicular to the contour. On either side of the landmark, k pixels are sampled using a certain step size, which gives profile vectors (112) of length 2k+1. This sampling scheme has the advantage that it is able to model linear intensity gradients at the landmark. The profiles may be normalized so that the sum of absolute values of elements in the profile is 1. The direction of sampling can be computed as the mean normal direction between the normals on the line segments resulting from connecting the landmark with its previous or its next neighbour, or as the normal on the line segment connecting the previous and next landmark.

Gray-Level Feature Images

The image structure around a landmark exhibits is captured in a number N of mathematical features as explained higher. The feature images (114) are obtained by computing a number of moments of the local histogram of derivative images in a window with width α around each location $x_0$. In a preferred embodiment the first and second histogram moments, all derivatives up to second-order $(L,L_x,L_y,L_{xx},L_{yy},L_{xy})$ and 5 inner scales (σ=0.5,1,2,4,8 pixels) are computed, amounting to a total of N=2×6×5=60 feature images. The window scale to compute the histogram is in accordance to the inner scale, i.e. α=2σ. The set of feature images (114) can be regarded as a gray-level decomposition of the gray-level function in the neighbourhood of a landmark.

Figure 11:
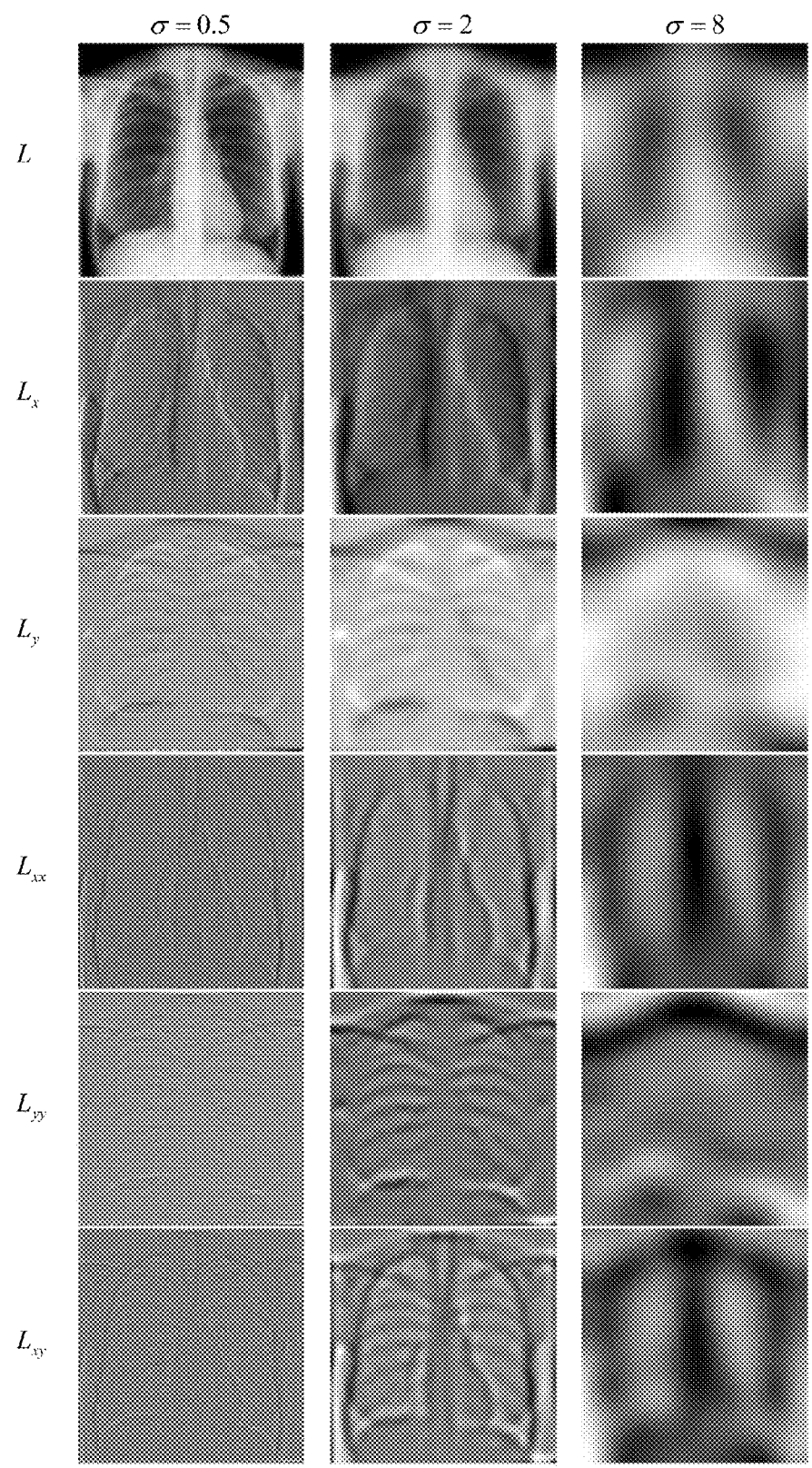
FIG. 11 shows first moment feature images of a chest radiograph, corresponding to the derivatives up to second-order $(L,L_x,L_y,L_{xx},L_{yy},L_{xy})$ and the scales σ equal to 0.5, 2 and 8 pixels.
Figure 12:
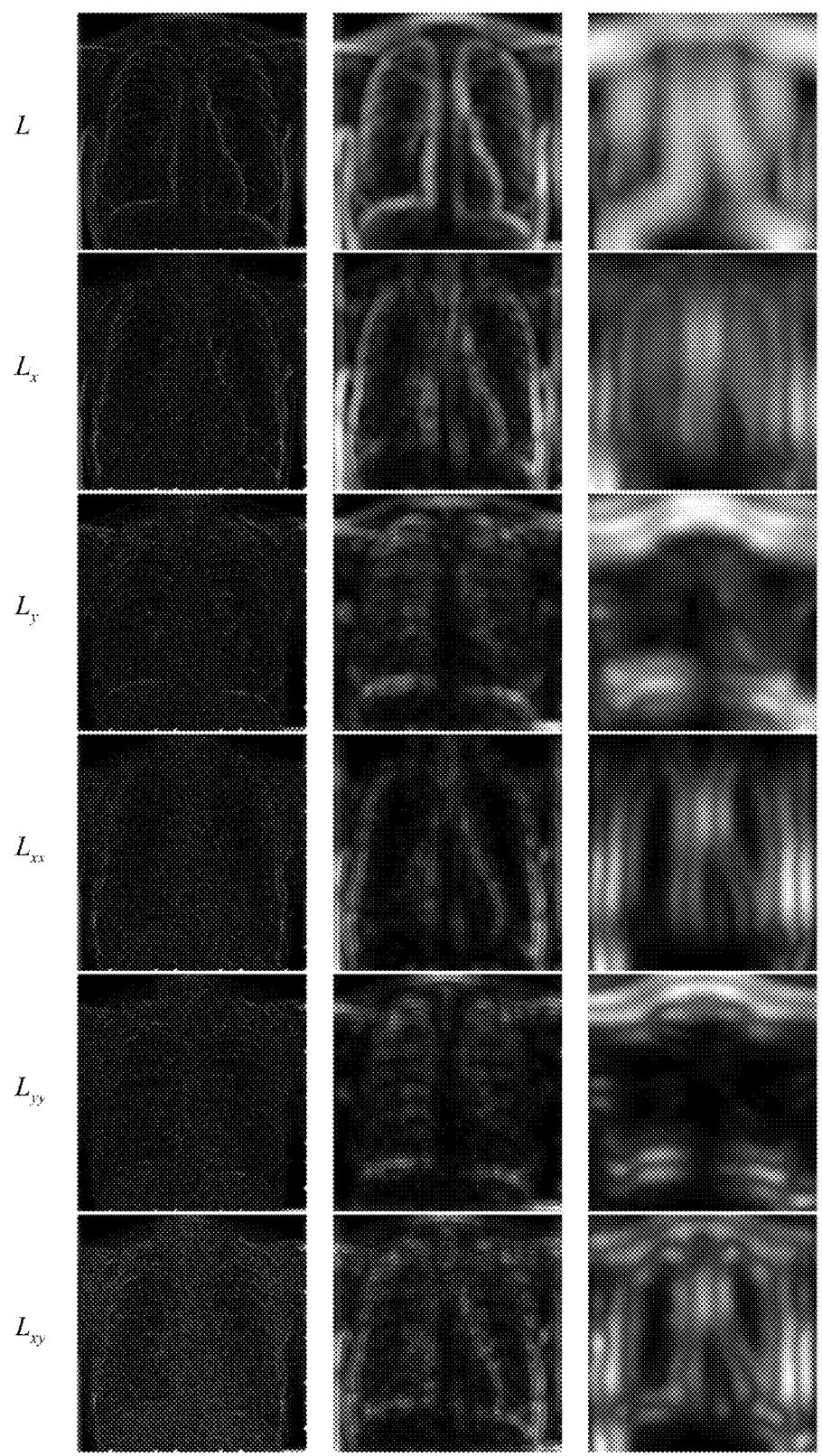
FIG. 12 shows second moment feature images of a chest radiograph, corresponding to the derivatives up to second-order $(L,L_x,L_y,L_{xx},L_{yy},L_{xy})$ and the scales σ equal to 0.5, 2 and 8 pixels.

An example of the computed feature images in a thorax image is given in FIG. 11 (first histogram moments of original image and 5 derivatives images at three scales) and FIG. 12 (second histogram moments of original image and 5 derivatives images at three scales). Thorax images normally appear in the upright position in the image; anatomic objects pertaining to other radiographic examinations may exhibit non-standardized position and rotation, in which case the construction of feature images may employ Cartesian Differential Invariants.

Gray-Level Appearance Model

All images of a training set are used to build a statistical model for each feature and each landmark. Denoting the normalized profile sampled at a landmark i (e.g. 14 in total for the 2D case of a thorax lung field) in feature j (e.g. 60 in total for 2D images) as a vector $g_{i,j}$, the probability distribution of $g_{i,j}$ is estimated from the training images, resulting in a mean $\bar{g}_{i,j}$ and a covariance $S_{i,j}$ (116). For a length of a profile vector of 2k+1, the size of this covariance matrix (116) is (2k+1)×(2k+1). The gray level appearance model for a certain landmark i having the mean profiles $\bar{g}_{i,j}$, j=1 . . . N and covariance matrices $S_{i,j}$, j=1 . . . N. The gray-level appearance model for the total lung field having the collection of all mean profiles $\bar{g}_{i,j}$, i=1 . . . n, j=1 . . . N and covariance matrices $S_{i,j}$, i=1 . . . n, j=1 . . . N.

Gray-Level Cost

The Mahalanobis distance between a new profile $g_{i,j}$ sampled at a point p in a new feature image j for a certain landmark i is computed as $$h_{i,j}(p)=(g_{i,j}(p)-\bar{g}_{i,j})^T S_{i,j}^{-1}(g_{i,j}(p)-\bar{g}_{i,j})$$

A smaller Mahalanobis distance means a larger probability that the profile $g_{i,j}(p)$ originates from the Gaussian distribution with mean $\bar{g}_{i,j}$ and covariance $S_{i,j}$. Hence, the Mahalanobis distance may be used as a gray-level cost measure, denoted as $h_{i,j}(p)$. This cost measure is a function of the location p in a given image. The location that most likely is the true location for the landmark i, in accordance to feature j, is the point p that minimizes $h_{i,j}(p)$. This gray-level cost can thus be defined for each feature j.

Shape Model

Figure 8:
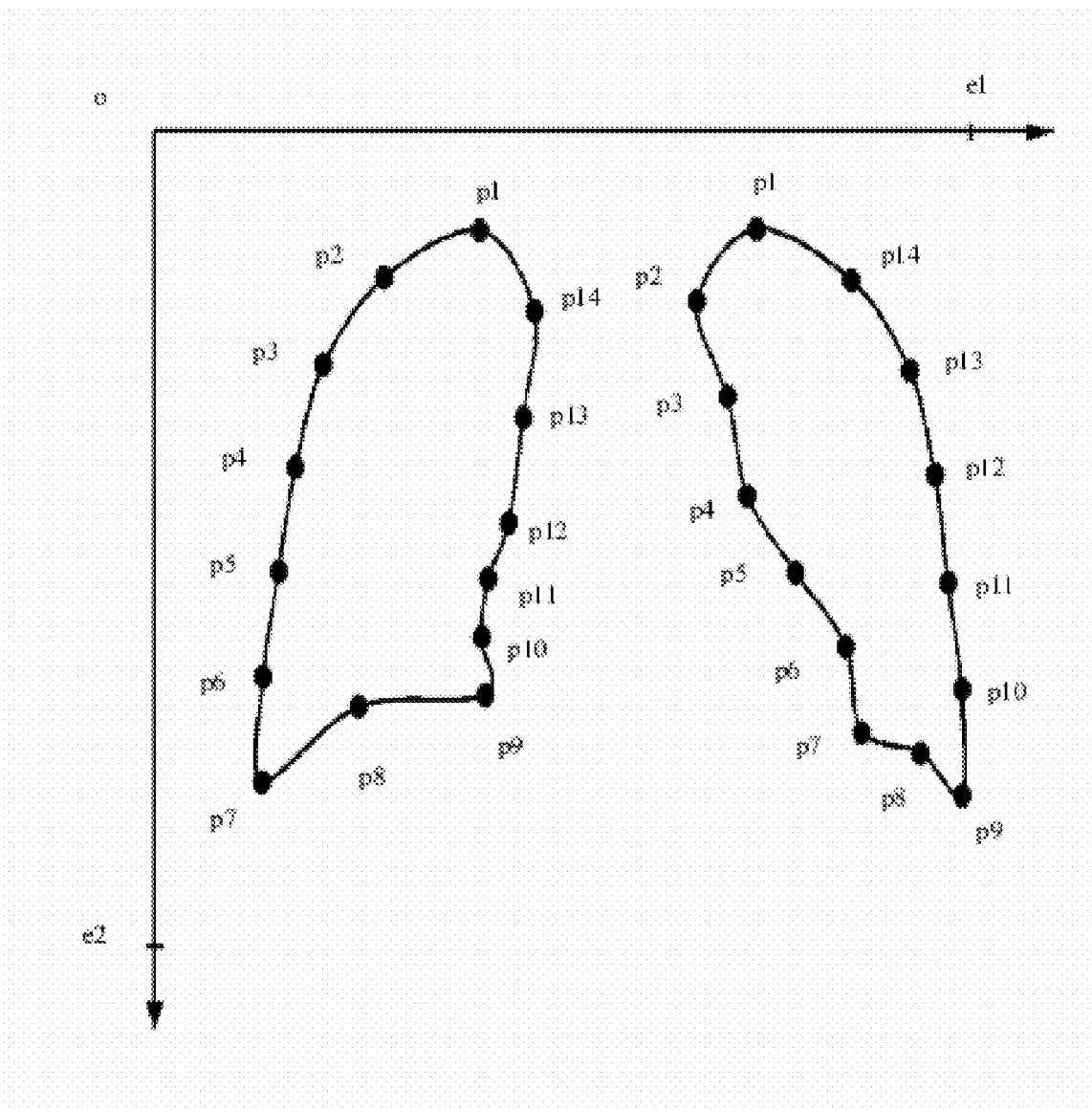
FIG. 8 illustrates a discrete representation of the lungs fields by a set of n landmarks $p_1=(x_1,y_1), \ldots, p_n=(x_n,y_n)$. The image sizes are normalized between 0 . . . 1. The continuous curve is interpolated through the discrete landmarks.

The curve outline, in the case of lung fields: one for each of the lung fields, is described by n landmark points (110) (FIG. 8). These landmark points are manually determined in a set of s training images, yielding a sequence of points $(x_1,y_1)$ . . . $(x_n,y_n)$. These coordinate tuples are subsequently positioned in a vector $x=(x_1,y_1,\ldots,x_n,y_n)^T$, representing the curve. Next Principal Components Analysis (PCA) (120) is applied to the shape vectors x of the training images. The PCA projects the curve in a lower dimensional space, covering the most important modes of geometric variation of the lung fields. Each curve $x \in \mathbb{R}^{2n}$ can be approximated by $b \in \mathbb{R}^t$ with t<<2n:

$$x \approx \bar{x} + \Phi b$$

with x the mean shape (122) and $\Phi \in \mathbb{R}^{2n \times t}$ the eigenvectors of the covariance matrix of x corresponding to the t largest eigenvalues. Each eigenvalue determines the variance of the shape for that shape mode (124). This curve approximation, represented by the vector b, constitutes the shape model (126) and fits the curve x into the shape model. The eigenshapes can be regarded as a zero-order (positional) geometric decomposition of the shape represented by the set of landmarks. The role of the shape model is to constrain the deformation of the object between the bounds of variation imposed by the training set, for example the three standard deviations with respect to the mean shape.

Figure 2:
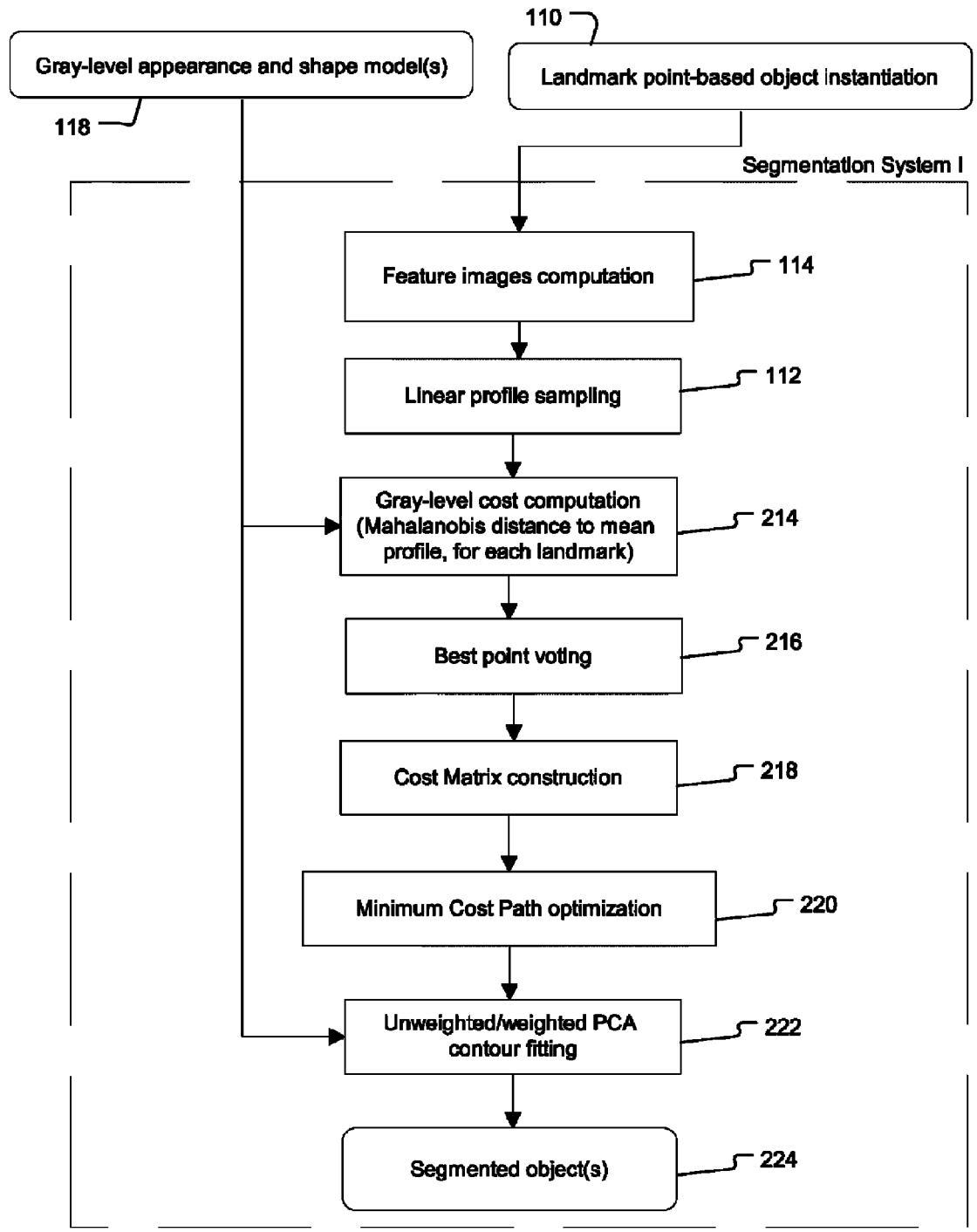
FIG. 2 is a flow chart illustrating a first segmentation system (Segmentation System I) according to the present invention.

Segmentation System I (FIG. 2)

The segmentation algorithm will initially position a curve, representing a lung field outline, in the image, and finds a segmentation solution (224) by iteratively updating the positions of the curve's constituent landmarks until an optimization criterion reaches an optimal value. Each iteration includes the following steps.

Step 1. Best Point Voting

Assuming a current position of a particular landmark, a better location for this landmark will be searched on a line perpendicular to the contour. On each side of the current position of the landmark, $n_s$ positions are evaluated. One of the $2n_s+1$ points will be voted as the best next point. Each feature of the set of N features contributes one vote to one of the $2n_s+1$ points. That point of the $2n_s+1$ points is selected that has minimum cost according to the Mahalanobis distance criterion (214). For each of the $2n_s+1$ points, the profile having 2k+1 points sampled in feature image j is put in the equation of $h_{i,j}(p)$ with the proper mean $\bar{g}_{i,j}$ and covariance $S_{i,j}$ filled in. The point with the lowest Mahalanobis distance is voted by that feature (216). Each feature chooses one point, resulting in N votes divided over $2n_s+1$ points as sets $N_1,\ldots,N_{2n_s+1}$ with $\Sigma_{k=1}^{2n_s+1} N_k = N$. Obviously the number N of features must be substantially larger than the number $2n_s+1$ of selectable points for otherwise there are too few votes that may be assigned to a point of the set of selectable points.

The number of votes $N_{i,j}$ that each point of the set of considered $2n_s+1$ points for a certain landmark i receives, may be regarded as a confidence rate that the particular point is the searched for landmark.

Step 2. Minimal Cost Path Optimization

According to the first step, each landmark may separately be displaced over $2n_s+1$ possible locations. The confidence rates $N_{i,j}$ can be put in a matrix (218) as follows $$R = \begin{bmatrix} N_{1,1} & \cdots & N_{1,2n_s+1} \\ \vdots & N_{i,j} & \vdots \\ N_{n,1} & \cdots & N_{n,2n_s+1} \end{bmatrix} \text{ with } \sum_{j=1}^{2n_s+1} N_{i,j} = N \; \forall \; i=1,\ldots,n.$$

Updating the contour involves choosing one element in each row of the matrix C; the concatenation of all elements forming a path through the matrix, such that a cost criterion is optimized (i.e. minimized), is a minimal cost path (MCP) search.

A logical choice would be to take the element with highest confidence in each row; this approach has the drawback that it does not take into account the presence of outliers. Therefore, it may include abrupt changes in the path. This drawback is overcome by imposing a smoothness constraint that excludes the abrupt changes.

To this purpose, first a cost matrix is constructed as follows:

$$C = \begin{bmatrix} 1/N_{1,1}^m & \cdots & 1/N_{1,2n_s+1}^m \\ \vdots & 1/N_{i,j}^m & \vdots \\ 1/N_{n,1}^m & \cdots & 1/N_{n,2n_s+1}^m \end{bmatrix},$$

with the power m in the denominator being a positive number that influences the computed path (a larger m yielding smaller cost contribution for a point and hence steering the path towards this point). Second, a cost function is constructed as follows:

$$J(j_1, j_2, \ldots, j_n) = \sum_{i=1}^n C_{i,j_i} + \alpha \sum_{i=1}^n |\delta_{i,j_i} - \delta_{i-1,j_{i-1}}|,$$

with $\delta_{i,j_i}$ the displacement of point i towards its target point $j_i$ along the normal to the shape and $\alpha$ a weight factor. The second term in this equation is the smoothness constraint that penalizes target point configurations for which displacements of one target point w.r.t. the displacement of the previous target point vary abruptly along the contour. The cost function J is optimized (220), using e.g. a technique known in the prior art as dynamic programming, described in e.g. D. H. Ballard, C. M. Brown, Computer Vision, Englewood Cliffs, Prentice Hall Inc. 1982, pp 137-143, resulting in the target points $(j^*_1,\ldots,j^*_n)$, that minimize J as a minimal cost path (MCP).

Alternatively to the matrix data structure, a layered graph may be used also. Each layer represents the array of perpendicularly sampled image points at a landmark. The graph is augmented with a set of arcs from the last layer back to the first. The dynamic programming technique extracts the boundary as an optimal closed path through the graph.

Step 3. Unweighted and Weighted PCA Contour Fitting (223)

In the previous step, each landmark i is given a new location $j^*_i$. The sequence $(j^*_1, \ldots, j^*_n)$ represents a contour that may be fitted in the shape model $x \approx \bar{x} + \Phi b$ by substituting it for x and deriving b by solving $\Phi b = x - \bar{x}$. Fitting x in the shape model means finding a b such that $\bar{x} + \Phi b$ approximates x with small errors in the high confidence landmarks.

Un-Weighted PCA Contour Fitting

Since $\Phi \in \mathbb{R}^{2n \times t}$ there are more equations than unknowns, and the system is over-determined, having no exact solution. Therefore, $\|\Phi b - (x - \bar{x})\|_p$ must be minimized for some suitable choice of p. Different norms render different optimum solutions. In particular the case of p=2, the least squares problem, is more tractable, and is solved in the prior art by methods based on normal equations and the QR factorization. Denoting the difference between actual point sequence and the fitted point sequence as the fit error $e = x - (\bar{x} + \Phi b)$, the problem is to seek the b to minimize $e^T e$. Substituting for e, this optimization problem becomes $$\min_b J(b) = \min_b e^T e = \min_b ((x - \bar{x})^T - b^T \Phi^T)((x - \bar{x}) - b\Phi).$$

J(b) is minimized if $\nabla J(b) = 0$. The gradient $\nabla J(b)$ of J(b) can be written $$\nabla J(b) = -2\Phi^T W^2 (x - \bar{x}) + 2\Phi^T W^2 \Phi b.$$

Hence the optimization problem leads to the equations $$\nabla J(b) = 0 \Leftrightarrow \Phi^T \Phi b = \Phi^T (x - \bar{x}),$$

known as the normal equations. These are solved for b as $$b = (\Phi^T \Phi)^{-1} \Phi^T (x - \bar{x})$$

This equation projects the data vector x of the image space into the PCA model space and returns the approximation coefficients b. The approximation result b may be projected back in image space by evaluating the shape model $x = \bar{x} + \Phi b$.

Weighted PCA Contour Fitting (222)

The corresponding number of votes $N_{i,j_i^*}$ may be used as weights when fitting the contour into the shape model. As a consequence, the PCA model will tend to give a high priority to the high confidence points. Points with a low confidence rate will lessen their influence on the contour that the model generates. The optimization problem now includes minimizing the weighted quadratic error $(We)^T(We)$. Using a similar approach with normal equations as in the un-weighted case, this problem leads to the solution for b expressed as $$b = (\Phi^T W^2 \Phi)^{-1} \Phi^T W^2 (x - \bar{x}).$$

This equation is evaluated to project x in the PCA space and may be projected back using the shape model $x = \bar{x} + \Phi b$.

Steps 1 to 3 are iterated until a stop criterion is fulfilled, e.g. when the positions of the landmarks do not change substantially between successive iterations.

Both the un-weighted and weighted PCA fitting yields the final segmentation result (224) as a set of landmark points x in the image. A continuous spline curve may be interpolated through these points to represent the segmentation analytically.

Figure 3:
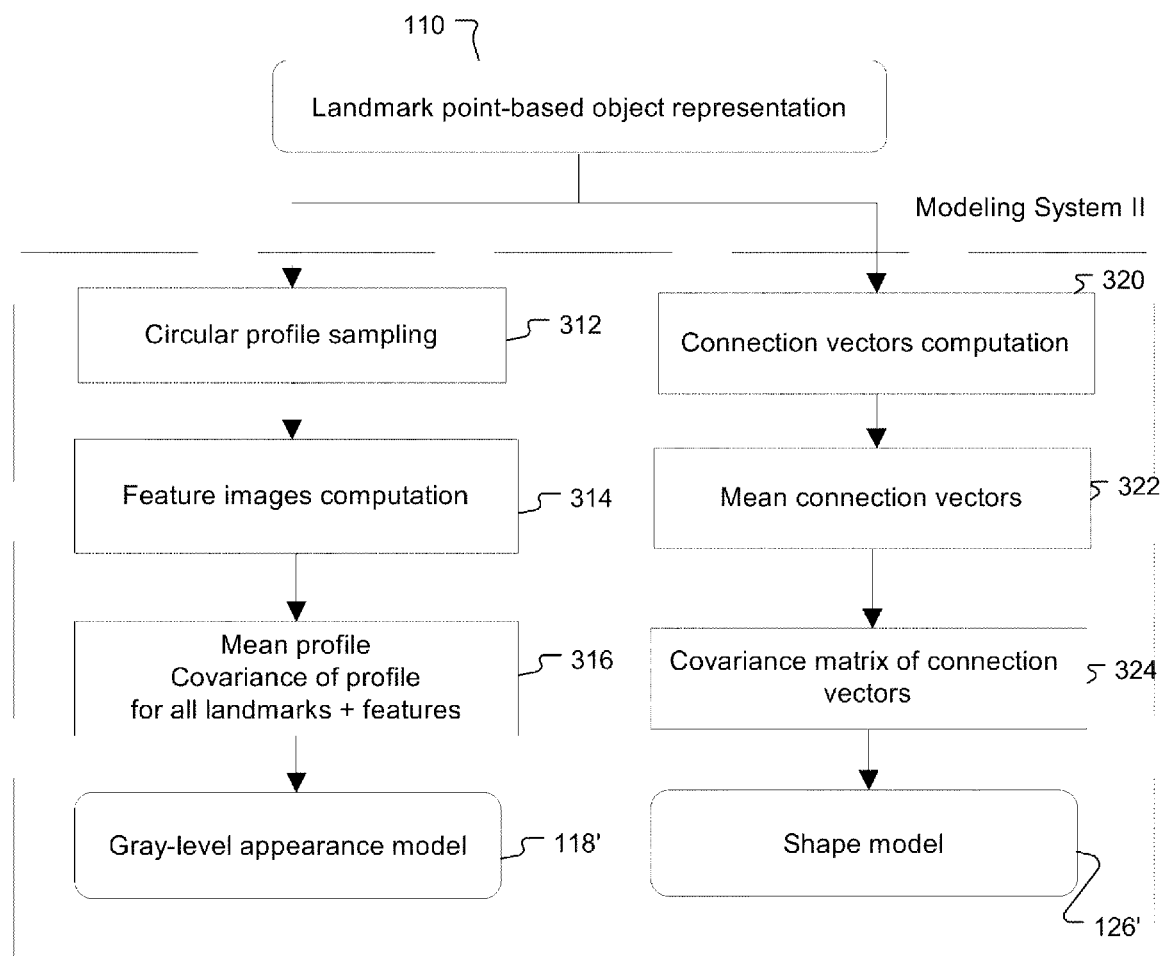
FIG. 3 is a flow chart illustrating a second modeling system (Modeling System II) according to the present invention.

Modeling System II (FIG. 3)

Gray Level Appearance Model

The gray level appearance model (118') captures the spatial intensity distribution in the neighborhood of landmarks. In this embodiment, the spatial model departs from circular profiles sampled in the neighborhood of a landmark. The number n of landmarks that is used to accurately describe a lung field outline may be as low as 14, e.g. landmark 1 denotes the uppermost point of each lung field, landmark 7 is positioned at the cross section of either the left or right heart shadow with their respective hemi-diaphragm, landmark 9 denoting the costophrenic angle. The other landmarks are equidistantly positioned between these major landmarks. Obviously, a higher number of landmarks may be used also in the computational scheme according to the present invention.

Circular Profiles

An alternative way for selecting the points in the neighborhood of a landmark is to sample points on a circle with center at the landmark and at least one radius (312). An example of a circular sampling is given in FIG. 9. If the landmark is located at $(x_0, y_0)$, the gray value function of the image is sampled at radius $r_c$ at the points $$\left(x_0 + r_c \cos\frac{2\pi}{n_c}(i-1), y_0 + r_c \sin\frac{2\pi}{n_c}(i-1)\right) i = 1, \ldots, n_c.$$

The samples are put in a profile vector of length $n_c$. Suitable choices of $n_c$ are 12, 8, 6, 4 and 3 (corresponding to 30, 45, 60, 90 and 120 degree angular spacing). Multiple circular sub-samplings at a set of radii may be considered simultaneously. Suitable radii $r_c$, expressed dimensionless as a fraction of the image size, are 0.05 and 0.025.

This scheme has the advantage over the linear profiles that it captures the 2D structure around the neighborhood. Specific anatomical landmarks such as the costophrenic corner point or the intersection of the left heart shadow with the left diaphragm are better modeled by circular profiles than linear profiles for they have discontinuous first derivative of the lung field contour. Landmarks along the lung field contour in the vicinity of these specific anatomical landmarks may also ambiguously be represented by a linear profile if its length is too long, for then the profile may cross the juxtaposed lung field border.

The circular profile may be normalized such that the sum of absolute values of the elements in the profile is 1. The degree of sub-sampling may range from no sub-sampling (yielding a re-sampling at original resolution of the image) to very sub-sampled, e.g. only 4 points on the main axes in the case of a circular profile.

Gray-Level Feature Images

The image structure around a landmark is captured in a number N of mathematical features as outlined in the summary of the invention. The feature images (314) are obtained by computing a number of moments of the local histogram of derivative images in a window with width α around each location $x_0$. In a preferred embodiment the first and second histogram moments, all derivatives up to second-order ($L, L_x, L_y, L_{xx}, L_{yy}, L_{xy}$) and 5 inner scales (σ=0.5,1,2,4,8 pixels) are computed, amounting to a total of N=2×6×5=60 feature images. The window scale to compute the histogram is in accordance to the inner scale, i.e. α=2σ. The set of feature images can be regarded as a gray-level decomposition of the gray-level function in the neighborhood of a landmark.

Gray-Level Cost

The Mahalanobis distance between a new profile $g_{i,j}$ sampled in a new feature image j for a certain landmark i is computed as $$h_{i,j}(p)=(g_{i,j}(p)-\bar{g}_{i,j})^T S_{i,j}^{-1}(g_{i,j}(p)-\bar{g}_{i,j})$$

A smaller Mahalanobis distance means a larger probability that the profile $g_{i,j}(p)$ originates from the Gaussian distribution with mean $\bar{g}_{i,j}$ and covariance $S_{i,j}$. Hence, the Mahalanobis distance may be used as a gray-level cost measure, denoted as $h_{i,j}(p)$. This cost measure is a function of the location p in a given image. The location that most likely is the true location for the landmark i, in accordance to feature j, is the point p that minimizes $h_{i,j}(p)$. This gray-level cost can thus be defined for each feature j.

A total gray-level cost is obtained by combining all gray-level costs for all features j in a sum $$h_i(p) = \sum_{j=1}^{N} (g_{i,j}(p) - \bar{g}_{i,j})^T S_{i,j}^{-1}(g_{i,j}(p) - \bar{g}_{i,j})$$

reflecting the similarity between the gray-level pattern at p and the expected gray-level pattern at landmark i. The location most likely to coincide with landmark i, in accordance to the gray-level appearance, is the solution of the optimization problem $$p_0 = \arg\min_{p} h_i(p).$$

To construct the gray-level appearance model (118'), the distributions ($\bar{g}_{i,j}$, $S_{i,j}$) of the feature profiles $g_{i,j}$ (for all landmarks i=1, ..., n, for all feature images j=1, ..., N have to be estimated from the training images.

Shape Model (126')

Whereas a gray-level cost validates a gray-level pattern or a pattern of features, a shape cost is defined to validate a connection between two successive landmarks.

Figure 10:
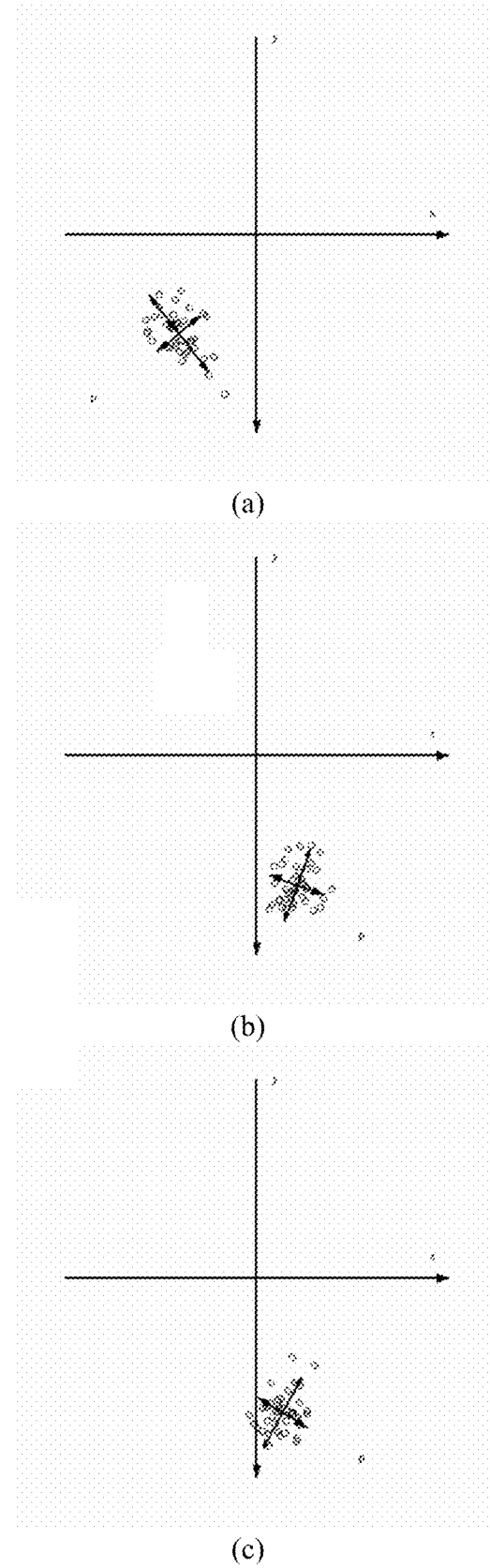
FIG. 10 shows experimentally estimated distributions for some connection vectors on the left lung shape having 14 landmarks: (a) $v_1$, (b) $v_2$, (c) $v_3$.

The curve outline, one for each of the lung fields, is described by n points (landmarks). These landmarks are manually determined in a set of s training images, yielding a sequence of points $(x_1,y_1) \ldots (x_n,y_n)=(p_1, \ldots, p_n)$. These coordinate tuples are subsequently positioned in a vector $x=(x_1,y_1, \ldots, x_n,y_n)^T$ (320), representing the shape. Considering a pair $(p_i,p_{i+1})$ of estimated positions of successive landmarks. A shape cost is assigned to the vector $v_i=p_{i+1}-p_i$, reflecting the plausibility of $v_i$ w.r.t. its probability distribution. The distributions of $v_1,v_2, \ldots, v_n$, assumed to have normal distributions around their mean, are estimated from the training shapes. The mean (322) and covariance (324) of $v_i$ are noted as $\bar{v}_i$ and $S_{v_i}$ respectively. An example of these vector distributions is given in FIG. 10. The vector distributions can be regarded as a first-order (tangential) geometric decomposition of the shape represented by the set of landmarks.

A novel shape cost validating a connection vector $v_i$ between two successive landmarks $p_i, p_{i+1}$ (a vector in the plane being fully characterized by its orientation and its length) is the Mahalanobis distance between $v_i$ and its mean $\bar{v}_i$:

$$f_i(v_i)=(v_i-\bar{v}_i)^T S_{v_i}^{-1}(v_i-\bar{v}_i).$$

A connection, which is unlikely to happen, because it has large Mahalanobis distance, will get a high shape cost. On the other hand, a zero cost will be assigned to a connection that equals the expected value.

Figure 4:
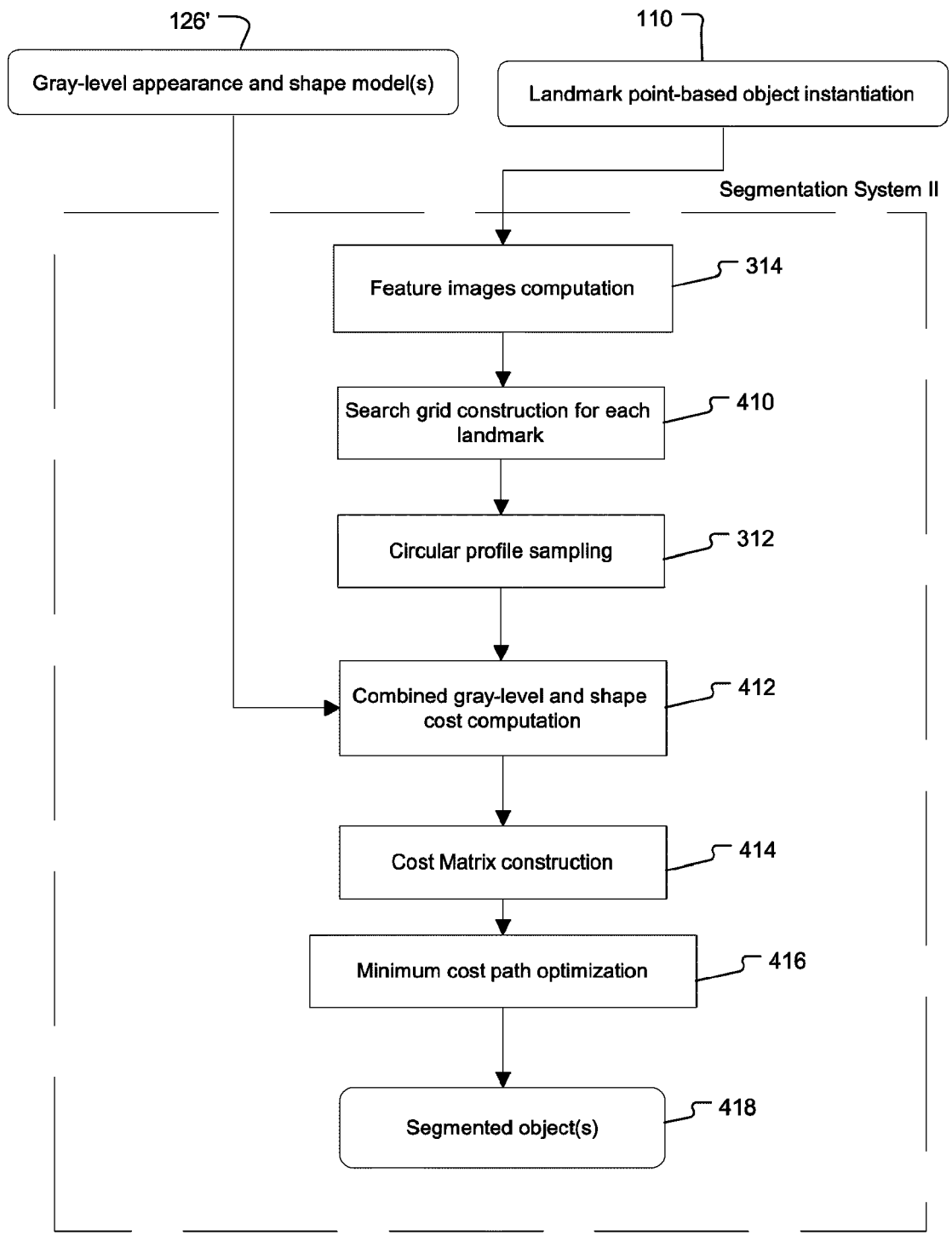
FIG. 4 is a flow chart illustrating a second segmentation system (Segmentation System II) according to the present invention.
Figure 5:
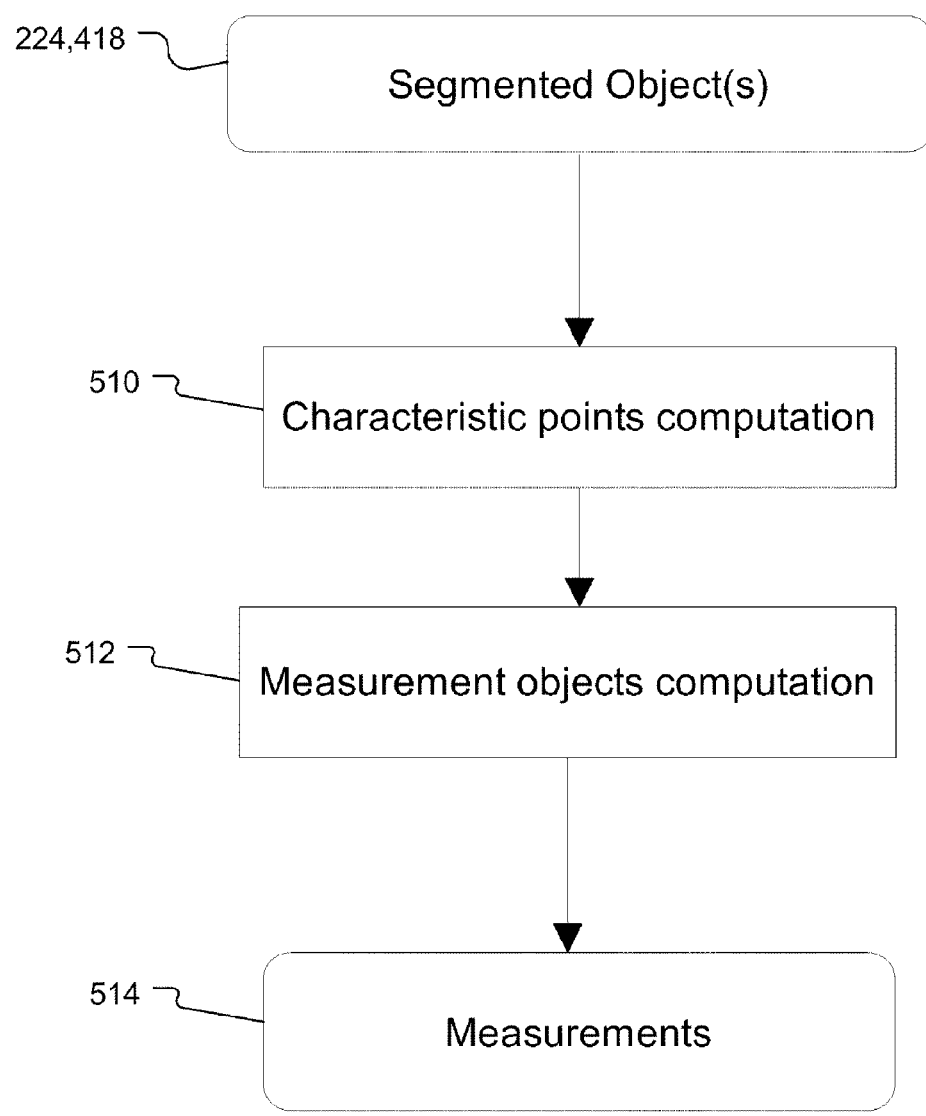
FIG. 5 is a flow chart illustrating measurement computation on the basis of the characteristic points on the anatomic objects segmented according to the present invention.

Segmentation System II (FIG. 4)

Knowledge about the gray-level appearance of the object in the image and about the shape of the object to be segmented is acquired during the training phase. This knowledge is subsequently used to segment the object in a new image (418) according to the following steps.

Step 1. Rectangular Search Grids Construction (410).

A rectangular search grid for each landmark i is constructed to constrain the possible locations of the landmark. Each rectangular grid is characterized by the parameters of geometric extent and grid spacing.

The grid spacing $r_g$ should be in accordance with the radius $r_c$ of the circular profiles (312) of the gray-level appearance model. A suitable relationship is $r_g = f_g r_c$ with $r_c$ the radius and $f_g$ a fixed fraction. A typical fraction for the grid spacing is $f_g=0.5$.

The grid extent and grid position is landmark specific and is represented by $x_{min}$, $x_{max}$, $y_{min}$ and $y_{max}$. The true (unknown) landmark) location $(x^*,y^*)$ is deemed to lie between the lower and upper borders:

$$x_{min} < x^* < x_{max}$$

$$y_{min} < y^* < y_{max}$$

These conditions can only be guaranteed if the grid spans the whole image area (i.e. $x_{min}=y_{min}=0$ and $x_{max}=y_{max}=1$). A more efficient approach is to constrain the search to a relevant part of the image. Assuming that the probability distribution $p_x(x)$ of the x-coordinate of the landmark is normal with mean $\bar{x}$ and standard deviation $\sigma_x$ (estimated from the training shapes). The grid borders $x_{min}$ and $x_{max}$, jointly defining the grid extent in the x-direction, are chosen such that $$\int_{x_{min}}^{x_{max}} p_x(x)dx = f_c$$

with $f_c$ some fraction representing the probability that the condition $x_{min} < x^* < x_{max}$ is true. A suitable value for the fraction $f_c$ is 0.995. If the requirement is imposed that the extent is symmetric around the mean $\bar{x}$, i.e. $x_{max}-\bar{x}=\bar{x}-x_{min}$, the upper border $x_{max}$ is the value that satisfies $$\frac{1}{\sigma_x\sqrt{2\pi}} \int_{\bar{x}}^{x_{max}} \exp\left(-\frac{(x-\bar{x})^2}{2\sigma_x^2}\right) dx = \frac{1}{2} f_c.$$

The lower border is then $x_{min}=2\bar{x}-x_{max}$. The borders for the y coordinate are obtained analogously.

Step 2. Gray-Level Cost Matrix Construction

The gray-level appearance model (126') is used to find proper locations for each landmark. The m best locations of landmark i, in accordance with the gray level appearance model, are selected as follows.

First, a rectangular grid covering a relevant part of the image area around the expected location of each landmark i is defined, according to the previous step.

Secondly, for each grid point, the total gray-level cost $h_i(p)$ is computed. The $p_{i,1}, p_{i,2}, \ldots, p_{i,m}$ corresponding to the m lowest total gray-level costs are selected.

Thirdly, a gray-level cost matrix C (414) is constructed so that each row i contains the costs of the m most likely locations of landmark i:

$$C = \begin{bmatrix} h_1(p_{1,1}) & \cdots & h_1(p_{1,k}) & \cdots & h_1(p_{1,m}) \\ \vdots & & \vdots & & \vdots \\ h_i(p_{i,1}) & \cdots & h_i(p_{i,k}) & \cdots & h_i(p_{i,m}) \\ \vdots & & \vdots & & \vdots \\ h_n(p_{n,1}) & \cdots & h_n(p_{n,k}) & \cdots & h_n(p_{n,m}) \end{bmatrix}.$$

A typical number m of best points per landmark ranges from 10 to 40.

As the m of best points per landmark are selected independently from the set of m of best points for a neighboring landmark, the situation may arise that one or more of these points are nearer to a non-neighboring landmark. These points will likely be neglected in the final contour segmentation by accounting for the shape cost in the next step.

Step 3. Minimal Cost Path Construction (416)

Determining the contour that segments the object is reduced to finding a path from top to bottom through the matrix C by selecting one element per row. Denoting the index of the selected element in row i as $k_i$, the curve becomes the point sequence $\{p_{1,k_1}, p_{2,k_2}, \ldots, p_{n,k_n}\}$. The optimal path $(k^*_1, k^*_2, \ldots, k^*_n)$ is the path that minimizes a cost function $J(k_1, \ldots, k_n)$:

$$(k_1^*, k_2^*, \ldots, k_n^*) = \arg\min_{k_1, \ldots, k_n} J(k_1, \ldots, k_n).$$

The models introduced above admit a number of cost measures. Considering two successive landmarks $p_{i,k_i}$ and $p_{i+1,k_{i+1}}$, a cost component (412) according to the gray-level appearance model and a cost component according to the shape model are:

The gray level costs $h_i(p_{i,k_i})$ and $h_{i+1}(p_{i+1,k_{i+1}})$ corresponding to the landmarks $p_{i,k_i}$ and $p_{i+1,k_{i+1}}$;

The shape cost $f_i(p_{i+1,k_{i+1}} - p_{i,k_i})$, which validates the plausibility of the connection from $p_{i,k_i}$ to $p_{i+1,k_{i+1}}$.

Both cost types can be incorporated in the cost function $J(k_1, \ldots, k_n)$ by means of a weighted sum of an overall gray-level cost and an overall shape cost. The overall gray-level cost with weight factor $\gamma_1$ is the sum of the landmark individual gray-level costs $h_i(p_{i,k_i})$, $i=1, \ldots, n$. The overall shape cost with weight factor $\gamma_2$ is the sum of the shape costs $f_i(p_{i+1,k_{i+1}} - p_{i,k_i})$, $i=1, \ldots, n$. Hence the cost function $J(k_1, \ldots, k_n)$ becomes $$J(k_1, \ldots, k_n) = \gamma_1 \sum_{i=1}^{n} h_i(p_{i,k_i}) + \gamma_2 \sum_{i=1}^{n-1} f_i(p_{i+1,k_{i+1}} - p_{i,k_i}) + \gamma_2 f_n(p_{1,k_1} - p_{n,k_n}).$$

The optimal path $(k^*_1, k^*_2, \ldots, k^*_n)$ that minimizes $J(k_1, \ldots, k_n)$ is called a Minimal Cost Path. The optimal path (416) is computed using dynamic programming techniques known in the prior art, such as introduced in G. Behiels et al., Evaluation of image features and search strategies for segmentation of bone structures using active shape models, Medical Image Analysis, 6(1):47-62, 2002. A typical weight factor for the gray-level cost is $\gamma_1=1$, and for the shape cost $\gamma_2=0.25$.

Figure 13:
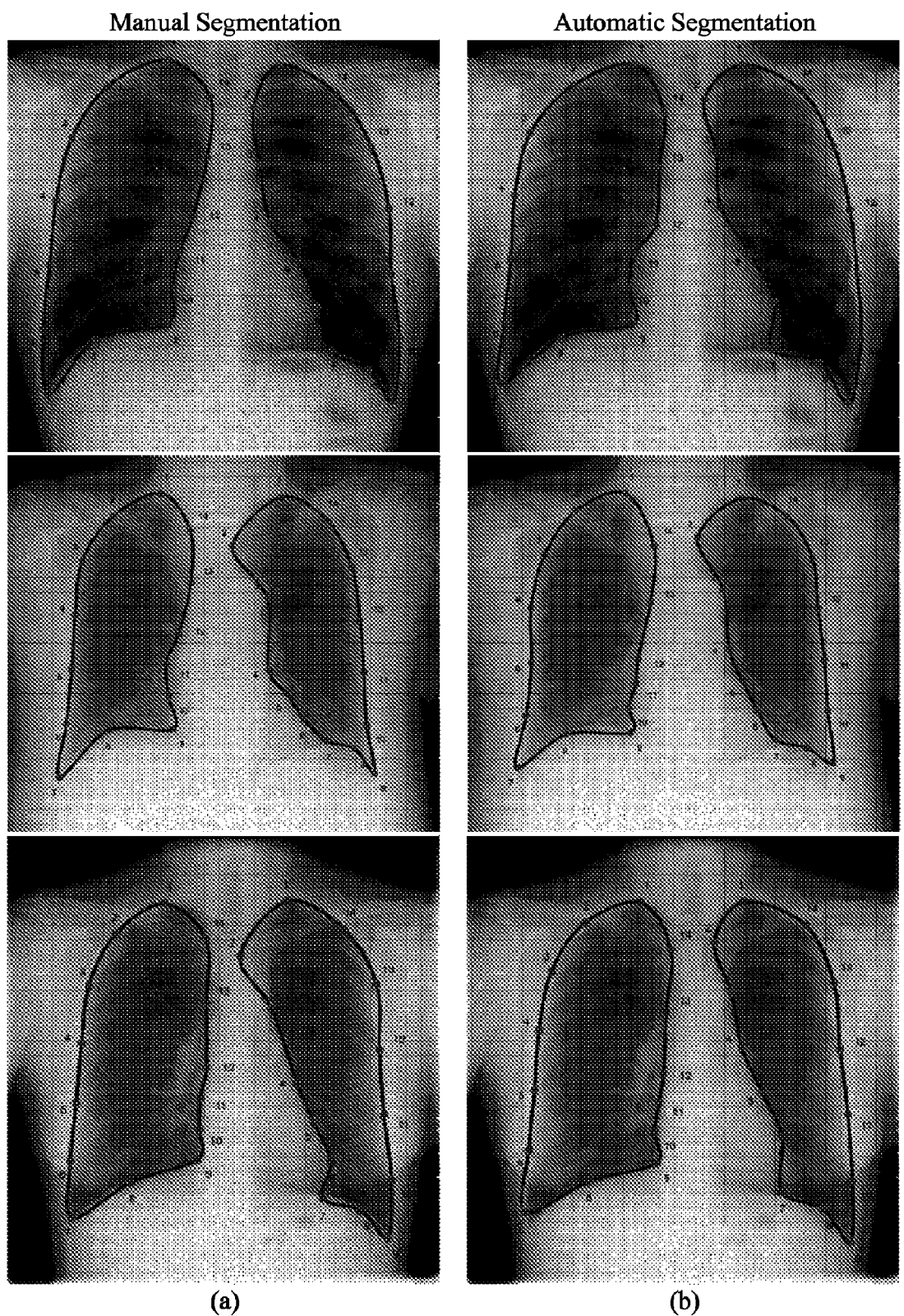
FIG. 13 shows examples of application of the present invention to the segmentation of lung fields on a chest radiograph: (a) manual segmentation of left and right lung field; (b) automatic segmentation of left and right lung field.

FIG. 13 shows the automatic segmentation of three thorax images according to the system outlined before, and compares it to the manual segmentation performed by an experienced radiologist. The 14 auto-placed landmarks on each lung field are shown, along with a continuous spline interpolation through them.

Computational Speed-Up Refinements

The segmentation method including steps 1-3 can be applied to segment only part of the outline of one or more anatomic entities. To this purpose the rectangular search grid is only constructed for a subset of consecutive landmarks. The gray level cost matrix will comprise a number of rows equal to the number of retained landmarks. The minimum cost path construction will minimize a cost function that only comprises a gray level term and a shape term for the retained landmarks. The resulting segmentation traces only that outline part that is covered by the retained landmarks. The obvious advantage of partial segmentation is computational speed when one is only interested in part of the anatomic entity outline, or when only some specific landmarks need to be located to obtain specific measurements.

Another algorithmic refinement to speed up the computation of the segmentation is to use a coarse-to-fine multi-resolution approach. The gray-level appearance and shape models are constructed on a multi-resolution representation for each landmark, introducing the spatial scale as a new dimension. Two alternatives are implemented to this purpose, both applying the segmentation concept over successively finer resolution levels.

In one alternative, during segmentation, the number of points in a profile, the number of points in the search grid and the number of landmark points along the contour are decreased in the original image. The positional precision of the landmarks is then increased by successively increasing the resolution of the search grid in the vicinity of the previous solution (the total number of considered points in the profile and search grid may thus be held constant at each iteration), and applying the finer resolution gray-level and shape models.

In another alternative, the multi-resolution approach may be implemented using a number of levels of a Gaussian and Laplacian pyramid and their associated derivative feature images. The initial position of the landmarks is determined on a coarse level, and is tracked to its final position on the finest level using the intermediate positions of the previous level as the starting position for the next level. Because the coarse resolution images contain fewer details, the search space will likely contain less false minima which will enable faster optimization at a given level and faster locating the landmarks towards their final position.

Training the Segmentation Models

A number of thoracic images is collected from an image repository, and presented sequentially in a Graphical User Interface. The following steps are performed to build the segmentation models:

An experienced user manually segments the lung fields in each displayed image, by indicating—using left mouse clicks—a number of points along the contour that delineates the lung field. These points need not be spaced equidistantly along the lung field outline; the only requirement is that the point set collectively approximates the lung field to a sufficiently high degree. To assess the anatomic fit, a spline curve is continually interpolated through the manually positioned points determined so far, until the curve is closed from the last point to the first point by a right mouse click. Manual segmentation adjustments can be made by dragging an individual point towards a new position. The resulting outline is again assessed with respect to anatomical correctness.

Next, a number of landmarks will be auto-placed on the manual segmented lung field contour. In order to achieve that identical landmarks on all images of the training set map on each other, the user positions a few number of easily discernible landmarks, the other landmarks are obtained by equidistantly placing points on the lung field contour. In the case of lung field outlines, a number of easily discernible landmarks are the topmost lung field point, the point denoting the costophrenic angle and the junction of heart shadow and hemi-diaphragm, a sub-total of three. Next a number of total landmarks are chosen, a suitable choice ranging from 14 to 40 for example. In the 14 landmark case, the points $p_1$, $p_7$ and $p_9$ represent the three fixed landmarks, five points are evenly distributed between $p_1$ and $p_7$, one point between $p_7$ and $p_9$, and another five points between $p_9$ and $p_1$. This step is performed separately on left and right lung fields.

Next, parameters pertaining to the training phase are asked: (a) image size for training (and segmentation), a typical value is 256 or 512; (b) fraction of the shape variance to be explained by the Principal Components Analysis (PCA), a typical value being 0.9999; (c) number of points in the profile, either linear or circular, a typical value for the circular profile being 12, 8, 6, 4 or 3; (d) radius of the circular profile as a fraction of the image dimension, typical values being 0.04, 0.03, 0.02.

Training of the gray-level appearance model: (a) decomposition of the gray-level function around the landmarks, i.e. computation of N feature images e.g. the local histogram moments of gray-value derivatives as outlined before, and (b) collection of the gray value distribution of the linear or circular profiles at the landmarks $p_i$, i.e. computation of $\bar{g}_{i,j}$, i=1...n, j=1...N and the covariance matrices $S_{i,j}$, i=1...n, j=1...N (i.e. for each landmark i in feature image j). This step generates the statistical gray-level appearance knowledge.

Training of the shape model: (a) computation of geometric decomposition of the zeroth order (positional) information contained in the landmarks, i.e. computation of the mean shape $\bar{x}$ and the t principal modes of variation (eigenshapes) arranged columnwise in a matrix b; (b) computation of the vector distributions (first order tangential information) contained in the connection sequence of landmarks, i.e. computation of the mean $\bar{v}_i$ and covariance $S_{v_i}$ of $v_i$. This step generates the statistical shape knowledge.

Storage of the statistical gray-level appearance and shape knowledge, e.g. to be used to segment the lung fields in a new image according to the model-based segmentation sub-systems given above.

Application of the Model-Based Segmentation in 2D Images to the Computation of the Cardio-Thoracic Ratio (CTR)

Figure 6:
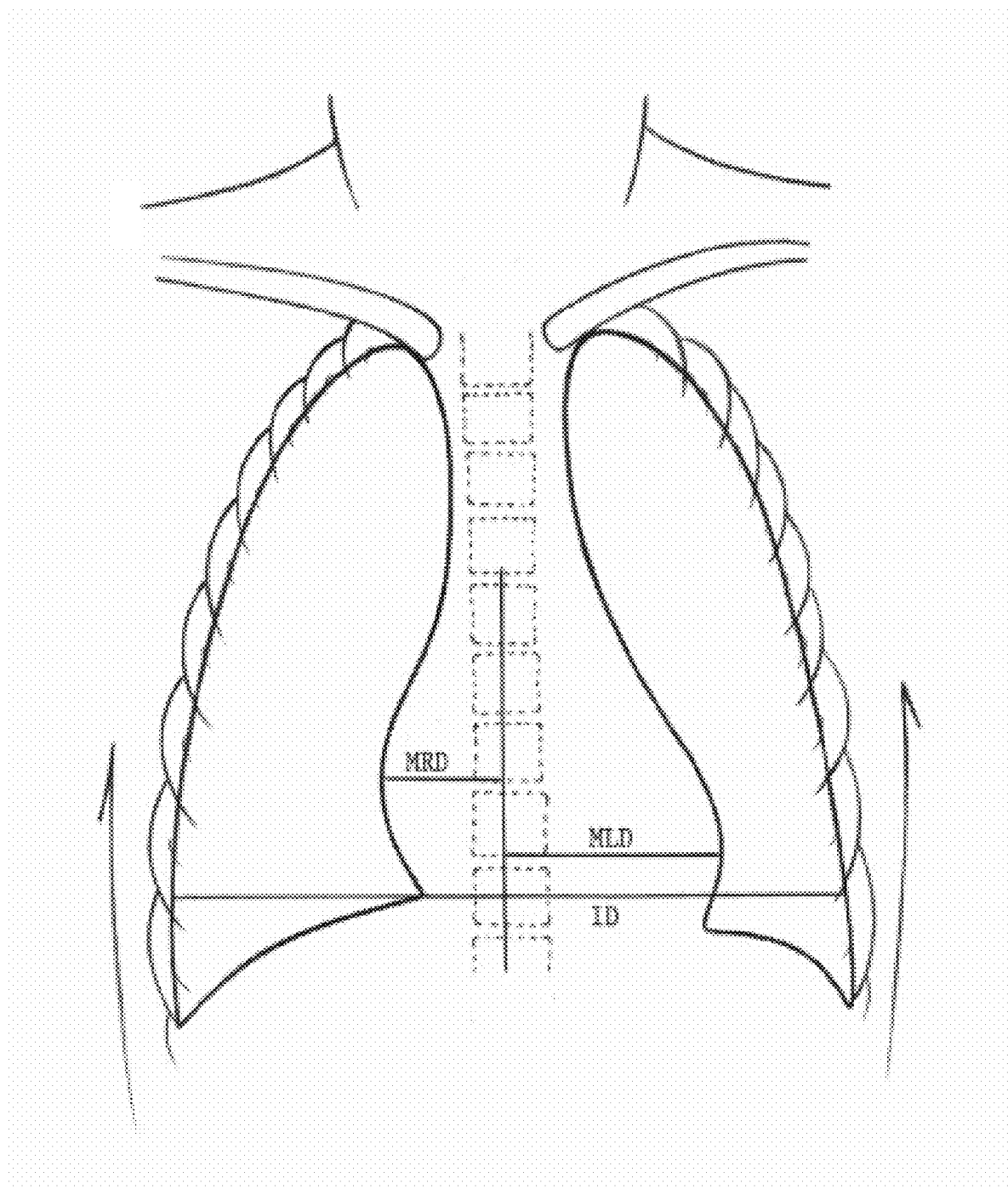
FIG. 6 is a measurement scheme for measurement of the cardiothoracic ratio from a chest radiograph, FIG. 7($a$) illustrates manual delineation of the left lung in a chest radiograph, in FIG. 7($b$) the left lung is represented as a set of landmarks $\{p_i\}_{i=1}^n$, in this example n=14.

An application of the automated lung field segmentation is the computation of the Cardiothoracic Ratio (CTR). The CTR (FIG. 6) is defined as the ratio of the transverse diameter of the heart to the internal diameter of the thorax (ID):

$$CTR = \frac{MLD + MRD}{ID}$$

with MLD the maximum transverse diameter on the left side of the heart and MRD the maximum transverse diameter on the right side of the heart. This index is an important clinical parameter, which varies for an adult between 39% and 50% with an average of about 45%. A cardiothoracic index higher than 50% is considered abnormal. Possible causes are cardiac failure, pericardial effusion and left or right ventricular hypertrophy. It is possible to compute the cardiothoracic ratio automatically, using the automatic lung field segmentation as disclosed in the present invention.

Referring to FIG. 8, the characteristic point defining MRD is obtained by selecting the Cartesian leftmost point on the fitted contour segment between landmarks p1 and p9 of the right lung segmentation; the characteristic point defining MLD is obtained by selecting the Cartesian rightmost point on the fitted contour segment between landmarks p1 and p7 of the left lung segmentation. The sum MLD+MRD is obtained by subtracting the column coordinates of these characteristic points and taking the absolute value. Similarly, the ID is obtained by selecting the Cartesian leftmost point on the fitted contour segment between landmarks p1 and p7 of the right lung segmentation and the Cartesian rightmost point on the fitted contour segment between landmarks p1 and p9 of the left lung segmentation, subtracting the column coordinates of these characteristic points and taking the absolute value.

Figure 14:
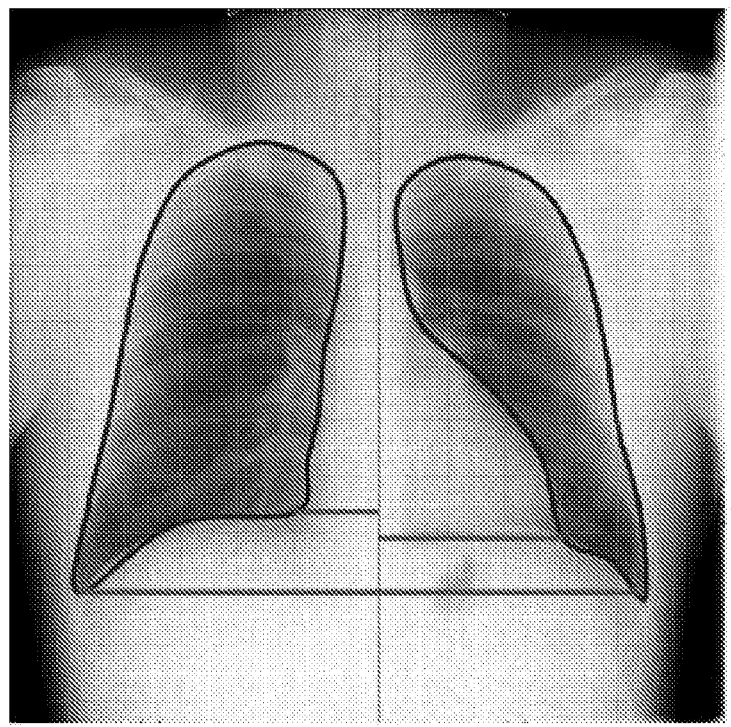
FIG. 14 illustrates the computation of the Cardiothoracic Ratio using (a) the manual lung field segmentations resulting in a $CTR_{man}=0.47$; (b) using the automatically derived lung field segmentations according to the present invention resulting in a $CTR_{automatic}=0.45$.
Figure 14:
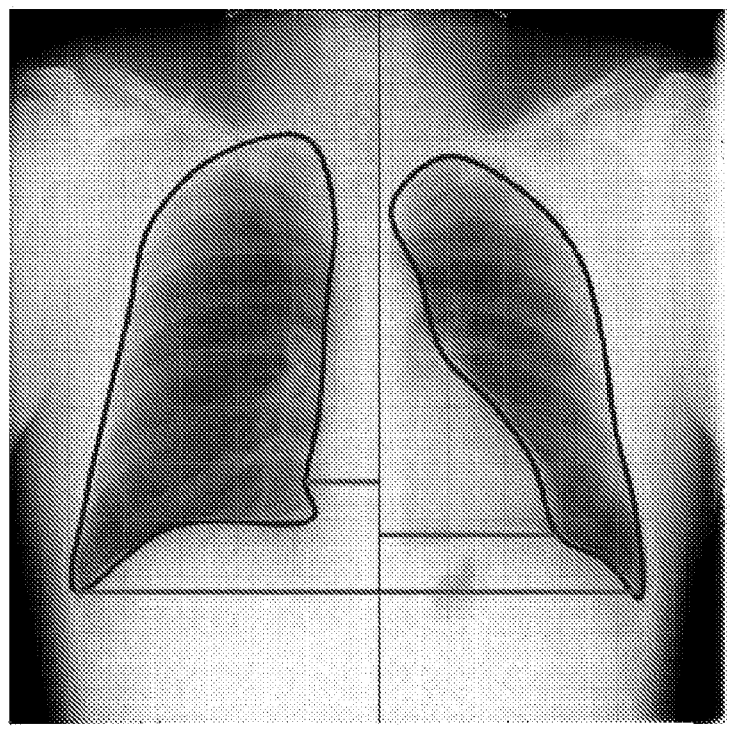

FIG. 14 shows the computation of the characteristic points on the segmented lung fields, and the computation of the cardiothoracic ratio using (a) the manual lung field segmentations resulting in a $CTR_{man}=0.47$; (b) using the automatically derived lung field segmentations according to the present invention resulting in a $CTR_{automatic}=0.45$.

Application of the Model-Based Segmentation and Measurement System to Other Body Parts The spatial extent of the search grid for each of the landmarks in the lung field segmentation is derived on the basis of the positions of all similar landmarks in a set of training thorax images. The concept of using a search grid for constraining the candidate positions for a given landmark can be extended for other body parts with that may have wider positional, rotational and size variation in the image than that of a lung field in a thorax image, and that do occupy the full image area as opposed to lung fields in a thorax image.

To allow for such positional, rotational and size variation of the body part, the concept of anchor point mapping of the search grids using methods disclosed in European patent application 04076454, entitled "Method for automatically mapping of geometric objects in digital medical images", may be applied in conjunction with the present invention. The refined method then becomes particular interesting to segment bony body parts in orthopedic radiographs because they are characterized by a relatively constant shape in the image, and they can be anchored to well manifested bony landmarks in the image.

For example, in a pelvis, hip or full leg examination, the femoral outlines can be anchored to well known landmarks such as the tip of the greater trochanter, the knee center and the femoral head center. These anchor points are used to establish an affine transformation between model anchor points and the associated anchor points selected in the actual image. Because a search grid has a collection of candidate points arranged in a rectangular lattice around a landmark point on the segmentation model contour in the model image, each of the constituent candidate points is mapped in turn in the actual image by applying the transformation to the model points' coordinates. In this way, the search grid for a given landmark point is reconstructed around the most likely position of the point. The optimization process then proceeds in the manner disclosed above by optimizing a combined gray value and shape cost for a path through a selected combination of candidate locations, one on each search grid. The path with most optimal cost is the final segmentation of the body part. Examples of other bones are hand and upper extremity bones, foot and lower extremity bones, pelvis and spinal vertebrae and structures.

Other body parts that are amenable to this type of landmark-based segmentation are soft-tissue organs in 3D CT of MR images. On the one hand, a slice-by-slice based approach may be taken here, that determines the segmented contour of the anatomy on each slice, and that combines the result of all slices into a 3D segmented surface. On the other hand, a fully 3D approach, extending the current concept on a 3D volume, may be adopted, that builds and applies models for 3D landmarks confined within 3D search grids. Kidneys, lungs, heart, liver, stomach, spleen, prostate and brain structures are examples of organs to which the method of the present invention is applicable.

In all application examples mentioned, measurement points may be based on the position of the landmarks on the segmentation or on a combination of several landmarks (such as a midpoint of two juxtaposed points on either side of the cortex of an elongated bone, a pair of which determines the bone's anatomical axis), and the landmark points may be subsequently fed into a measurement system such as disclosed in EP A 1349098.

The invention claimed is:

1. A method of segmenting an anatomic entity in a digital medical image comprising:
    defining, for each of a number of landmarks in said image, an initial position of said landmark,
    sampling a neighborhood around said initial position, said neighborhood comprising a number of candidate locations of said landmark,
    associating a cost with each of said candidate locations,
    optimizing a cost function expressing a weighted sum of overall gray level cost and overall shape cost for all candidate locations,
    defining a segmented anatomic entity as a path through a selected combination of said candidate locations for which combination said cost function is optimized,
wherein said cost associated with a candidate location is the total gray level cost obtained by summing gray level costs of said candidate location in every feature image of a set of feature images calculated from said medical image, said gray level costs being expressed as the Mahalanobis distance defined as the distance between the gray value profile at said candidate location with a corresponding mean profile weighted by the inverse of a corresponding covariance matrix, said mean profile and covariance matrix retrieved from a gray value model associated with said anatomic entity.

2. A method according to claim 1 wherein said gray value model is obtained by
    sampling a manually segmented outline of said anatomic entity at a number of landmark points;
    sampling a number of points in a neighborhood of each of said landmark points;
    for each landmark point arranging sampled points in a neighborhood around a landmark point in a profile;
    computing at least one feature image;
    computing a mean profile for each landmark point and for each feature image;
    computing a covariance matrix of the profiles for each landmark point and each feature image;
    identifying said mean profile and covariance matrix as gray value model of said anatomic entity.

3. A method according to 1 wherein a feature image is a derivative image at a predefined scale σ or an image representation comprising mathematical moments of the local histogram of said image or derivative image in a window with width α around the location of a landmark.

4. A method according to claim 1 wherein said overall gray level cost is a combination of all individual gray level costs of a profile in a number of feature images whereby said individual cost is the Mahalanobis distance defined as the distance between said profile and the mean profile of that feature weighted with the inverse of the covariance matrix, said mean profile and covariance matrix being retrieved from a gray value model of said anatomic entity.

5. A method according to claim 4 wherein said gray value model is obtained by
    sampling a manually segmented outline of said anatomic entity at a number of landmark points;
    sampling a number of points in a neighborhood of each of said landmark points;
    for each landmark point arranging sampled points in a neighborhood around a landmark point in a profile;
    computing at least one feature image;
    computing a mean profile for each landmark point and for each feature image;
    computing a covariance matrix of the profiles for each landmark point and each feature image;
    identifying said mean profile and covariance matrix as gray value model of said anatomic entity.

6. A method according to claim 1 wherein said overall shape cost is a combination of all individual costs of connection vectors, said connection vectors connecting successive landmarks, for all landmarks whereby said individual shape cost is expressed by the Mahalanobis distance defined as the distance of a connection vector between two successive landmarks to the mean connection vector weighted with the inverse of the covariance matrix, said mean connection vector and covariance matrix being retrieved from a shape model of said anatomic entity.

7. A method according to claim 6 wherein said shape model is obtained by
    sampling a manually segmented outline of said anatomic entity at a number of landmark points;
    computing connection vectors or connection vector differences between successive landmark points;
    computing a mean connection vector or mean connection vector difference for successive pairs of landmark points;
    computing a covariance matrix of connection vectors or connection vector differences;
    identifying said mean connection vector and covariance matrix as a geometric model of said anatomic entity.

8. A method according to claim 1 wherein said cost function is optimized by dynamic programming.

9. A method according to claim 1 wherein said number of candidate locations is reduced by selecting those with minimal total gray value cost, said total gray value cost being the sum over all feature images of all gray value costs for the candidate position in said neighborhood, said gray value cost expressed as a Mahalanobis distance defined as the distance of a gray value profile at the candidate location to a corresponding mean profile weighted with the inverse of a covariance matrix, said mean profile and covariance matrix retrieved from a gray value model associated with said anatomic entity.

10. A method according to claim 1 wherein said neighborhood comprises a rectangular grid of sampling points.

11. A method according to claim 1 wherein said neighbourhood comprises a circular profile.

12. A method according to claim 1 wherein said gray value model and said geometric model are constructed from and applied to a multi-resolution representation of the image.

13. A method of measuring an anatomic entity in a digital medical image comprising
   calculating a segmentation of said anatomic entity using a method according to claim 1,
   calculating or selecting characteristic points based on the segmentation of said anatomic entity,
   calculating measurement objects based on said characteristic points,
   deriving measurements of said anatomic entity on the basis of said measurement objects.

14. A method of measuring an anatomic entity in a digital medical image comprising
   calculating a segmentation of said anatomic entity using a method according to claim 1,
   identifying said landmarks as measurement points,
   calculating measurement objects based on said measurement points,
   deriving measurements of said anatomic entity on the basis of said measurement objects.

15. A non-transitory computer program product embodied in a computer readable medium for performing the steps of the method of claim 1.

16. A non-transitory computer readable medium comprising computer executable program code for performing the steps of the method of claim 1.

17. A non-transitory computer program product embodied in a computer readable medium for performing the steps of the method of claim 13.

18. A non-transitory computer readable medium comprising computer executable program code for performing the steps of the method of claim 13.

19. A non-transitory computer program product embodied in a computer readable medium for performing the steps of the method of claim 14.

20. A non-transitory computer readable medium comprising computer executable program code for performing the steps of the method of claim 14.

21. A method of segmenting an anatomic entity in a digital medical image comprising:
   defining, for each of a number of landmarks in said image, an initial position of said landmark,
   sampling a neighborhood around said initial position, said neighborhood comprising a number of candidate locations of said landmark,
   associating a cost with each of said candidate locations,
   optimizing a cost function expressing a weighted sum of overall gray level cost and overall shape cost for all candidate locations,
   defining a segmented anatomic entity as a path through a selected combination of said candidate locations for which combination said cost function is optimized,
wherein said cost associated with a candidate location is the total gray level cost obtained by summing gray level costs of said candidate location in every feature image of a set of feature images calculated from said medical image, said gray level costs being expressed as the Mahalanobis distance defined as the distance between the gray value profile at said candidate location with a corresponding mean profile weighted by the inverse of a corresponding covariance matrix, said mean profile and covariance matrix retrieved from a gray value model associated with said anatomic entity, and wherein said neighborhood comprises a circular profile.

* * * * *